US012134574B2

United States Patent
Glatz et al.

(10) Patent No.: US 12,134,574 B2
(45) Date of Patent: Nov. 5, 2024

(54) OAE SYSTEM WITH CONTROLLED ACID NEUTRALIZATION

(71) Applicant: Ebb Carbon, Inc., San Carlos, CA (US)

(72) Inventors: Guenther Glatz, Menlo Park, CA (US); Jeremy Loretz, Burlingame, CA (US); Matthew Eisaman, Port Jefferson, NY (US); Todd Pelman, Moss Beach, CA (US)

(73) Assignee: Ebb Carbon, Inc., San Carlos, CA (US)

( * ) Notice: Subject to any disclaimer, the term of this patent is extended or adjusted under 35 U.S.C. 154(b) by 0 days.

(21) Appl. No.: 18/620,819

(22) Filed: Mar. 28, 2024

(65) Prior Publication Data

US 2024/0327260 A1 Oct. 3, 2024

Related U.S. Application Data

(60) Provisional application No. 63/455,474, filed on Mar. 29, 2023.

(51) Int. Cl.
*C02F 1/46* (2023.01)
*B01F 25/50* (2022.01)
(Continued)

(52) U.S. Cl.
CPC ............... *C02F 1/66* (2013.01); *B01F 25/50* (2022.01); *B01F 35/2132* (2022.01);
(Continued)

(58) Field of Classification Search
CPC .......... C02F 1/001; C02F 1/008; C02F 1/469; C02F 1/4693; C02F 1/52; C02F 1/66;
(Continued)

(56) References Cited

U.S. PATENT DOCUMENTS 4,747,958 A * 5/1988 Eberhardt ................. C02F 7/00
210/242.1
5,089,120 A * 2/1992 Eberhardt ................. C02F 1/66
114/283
(Continued)

FOREIGN PATENT DOCUMENTS

CN 117326582 A * 1/2024
CN 117446925 A * 1/2024
(Continued)

OTHER PUBLICATIONS

English Translation of Patent Publication DE 20306503, published Aug. 21, 2003. (Year: 2003).*
(Continued)

*Primary Examiner* — Joseph W Drodge
(74) *Attorney, Agent, or Firm* — Bever, Hoffman & Harms, LLP

(57) ABSTRACT

Acid byproduct from an OAE system is mixed with an aqueous alkaline fluid under conditions that maintain the mixture at or above a target pH level at which the rate of acid neutralization is maximized and the release of $CO_2$ into the atmosphere is prevented. A neutralization controller utilizes sensor data to monitor the mixture's pH level and to control the rate at which acid byproduct is added (e.g., by a dosing pump) to the mixture. A reaction tank and an optional circulation line and in-line mixer are utilized to perform the mixing process. An optional agitator mechanism is provided to stir the mixture in the reaction tank, and to optionally move sensors and/or injectors along circular paths through the mixture. Optional fixed sensors and/or injectors are located in designated spaced-apart regions inside the reaction tank. The mixture is treated using optional flocculation and grit processing systems/devices.

17 Claims, 8 Drawing Sheets

(51) Int. Cl.
*B01F 35/21* (2022.01)
*C02F 1/469* (2023.01)
*C02F 1/52* (2023.01)
*C02F 1/66* (2023.01)
*C02F 103/08* (2006.01)

(52) U.S. Cl.
CPC .............. *C02F 1/4693* (2013.01); *C02F 1/52* (2013.01); *C02F 2103/08* (2013.01); *C02F 2201/4618* (2013.01); *C02F 2209/06* (2013.01); *C02F 2209/40* (2013.01)

(58) Field of Classification Search
CPC .. C02F 1/685; C02F 1/686; C02F 1/72; C02F 9/00; C02F 2103/08; C02F 2201/4612; C02F 2201/46145; C02F 2201/4618; C02F 2209/06; C02F 2209/07; C02F 2209/40; B01D 61/42; B01D 61/422; B01D 61/44; B01D 61/445; B01D 61/46; B01D 61/461; B01D 2311/2615; B01D 2311/263; B01D 2311/2634; B01D 2311/2638; B01D 2311/2653; C01B 5/00; C01B 13/027; C01B 13/14; C01B 13/145; C01B 13/32; C01B 13/326; B01F 25/50; B01F 25/51; B01F 25/53; B01F 25/54; B01F 35/2132

See application file for complete search history.

(56) References Cited

U.S. PATENT DOCUMENTS

| | | | | |
|---|---|---|---|---|
| 9,937,471 | B1* | 4/2018 | Eisaman | C02F 1/66 |
| 11,629,067 | B1* | 4/2023 | Pelman | B01D 53/62 210/652 |
| 2008/0221283 | A1* | 9/2008 | Adams | B01J 19/2435 526/64 |
| 2011/0135551 | A1 | 6/2011 | House et al. | |
| 2012/0152359 | A1* | 6/2012 | Burnett | B01F 25/3141 137/896 |
| 2013/0008792 | A1* | 1/2013 | Eisaman | B01D 61/445 204/537 |
| 2013/0180400 | A1 | 7/2013 | Iwamoto et al. | |
| 2013/0259743 | A1 | 10/2013 | Keasler et al. | |
| 2013/0336722 | A1* | 12/2013 | Wright | B01D 61/445 423/437.1 |
| 2015/0235545 | A1* | 8/2015 | Schoenheit | C02F 1/008 210/85 |
| 2016/0362800 | A1* | 12/2016 | Ren | C25B 11/073 |
| 2017/0341952 | A1* | 11/2017 | Eisaman | B01D 61/44 |
| 2019/0255495 | A1* | 8/2019 | Shapira | A23B 4/20 |
| 2023/0080924 | A1* | 3/2023 | Thyagarajan | C02F 1/469 210/150 |
| 2023/0130444 | A1* | 4/2023 | Sheldon-Coulson | C02F 1/22 210/747.6 |
| 2023/0139033 | A1* | 5/2023 | Schlueter | B01F 35/2132 366/152.1 |
| 2023/0191322 | A1* | 6/2023 | Shors | B01D 53/965 423/220 |
| 2023/0212031 | A1* | 7/2023 | Pelman | C02F 1/008 210/652 |
| 2023/0357058 | A1* | 11/2023 | Hu | B01D 61/464 |
| 2023/0390704 | A1* | 12/2023 | Eisaman | C02F 1/4693 |
| 2024/0182340 | A1* | 6/2024 | Atwater | B01D 71/262 |

FOREIGN PATENT DOCUMENTS

| | | | |
|---|---|---|---|
| DE | 20306503 U1 * | 7/2003 | ............... C02F 1/66 |
| KR | 20080082597 A | 9/2008 | |
| WO | 2022030529 A1 | 2/2022 | |

OTHER PUBLICATIONS

Ibadillah Digdaya et al, "A direct coupled electrochemical system for capture and conversion of CO2 from oceanwater", published in Nature Communications, 2020. (Year: 2020).*

Katsuyoshi Tatennuma et al., The challenge of Global CO2 reduction: The potential of the method based on seawater electrolysis, published in Advances in Environmental Studies, vol. 6, Issue 1, pp. 452-454, Mar. 4, 2022. (Year: 2022).*

Oshlies et al NPL publication "Guide to Best Practices in Ocean Alkalinity Enhancement Research", Copernicus Publications, published 2023. (Year: 2023).*

English Translation of patent publication CN-117326582-A, Chen, Jan. 2, 2024 (Year: 2024).*

English Translation of patent publication CN-117446925-A, Cong, Jan. 26, 2024 (Year: 2024).*

Smith, Pete et al., Review Article entitled "Biophysical and economic limits to negative C02 emissions", published online Dec. 7, 2015, 9 pages.

House, Kurt Zenz et al., article entitled "Electrochemical Acceleration of Chemical Weathering as an Energetically Feasible Approach to Mitigating Anthropogenic Climate Change", Environ. Sci. Technol. 2007, 41, 8464-8470 (7 pages).

* cited by examiner

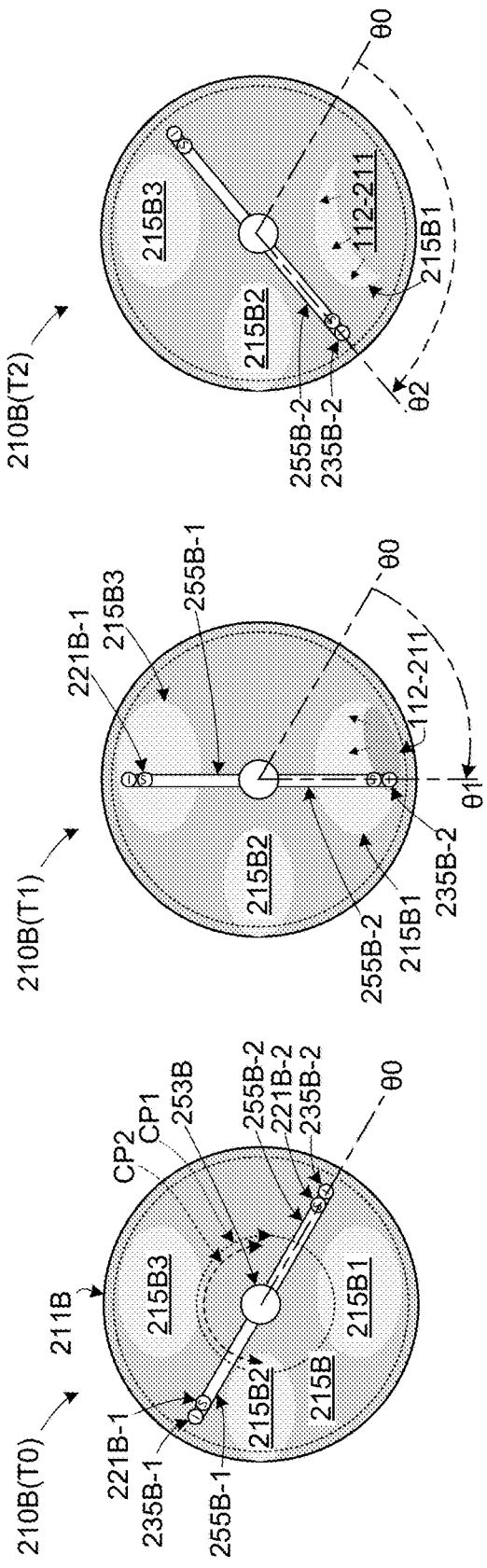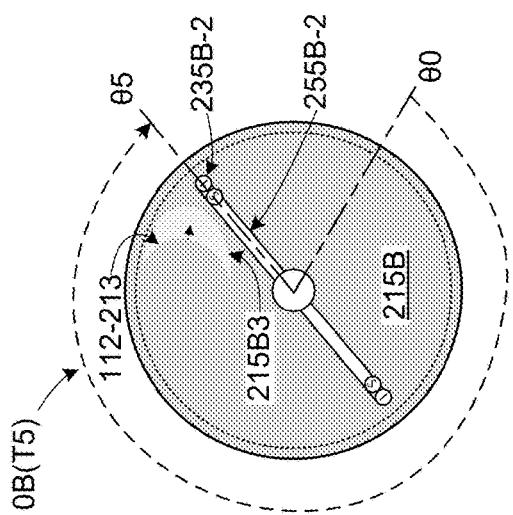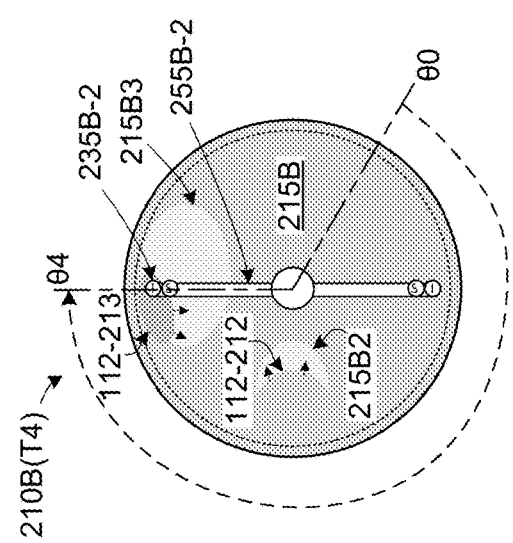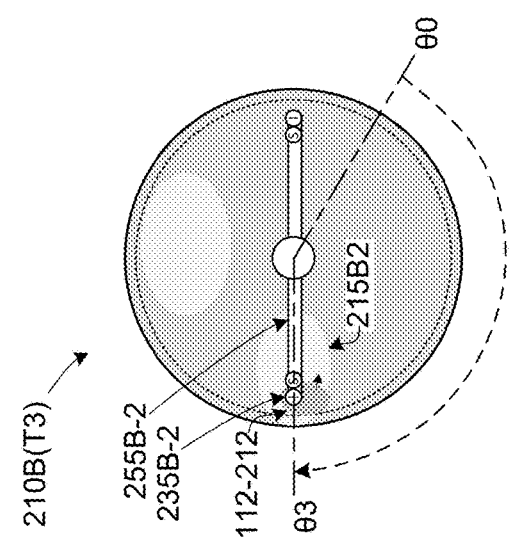

OAE SYSTEM WITH CONTROLLED ACID NEUTRALIZATION

RELATED APPLICATIONS/PATENTS

This application claims priority from U.S. Provisional Patent Application No. 63/455,474, entitled "OAE SYSTEM WITH CONTROLLED ACID NEUTRALIZATION", which was filed on Mar. 29, 2023.

FIELD OF THE INVENTION

The systems and methods described herein generally relate to systems and methods for neutralizing acid, and more specifically to systems/methods for neutralizing an acid product generated by an ocean alkalinity enhancement (OAE) system.

BACKGROUND OF THE INVENTION

As humans burn more and more fossil fuels, the resulting increased carbon dioxide ($CO_2$) concentration in Earth's atmosphere causes both climate change and ocean acidification. The increased atmospheric concentrations of $CO_2$ and other greenhouse gasses (e.g., methane) produces climate change by trapping heat close to earth's surface, thereby increasing both air and sea temperatures. Because earth's oceans absorb about 25% of atmospheric $CO_2$, and because the absorbed $CO_2$ dissolves to form carbonic acid that remains trapped in the seawater, the increased atmospheric $CO_2$ concentration caused by burning fossil fuels also produces ocean acidification by way of increasing the amount of $CO_2$ gas dissolved in the ocean.

Both climate change and ocean acidification pose significant threats to humans. Climate change in the form of increased global average temperatures can produce several dangerous effects such as the loss of polar ice and corresponding increased sea levels, disease, wildfires and stronger storms and hurricanes. Ocean acidification changes the ocean chemistry that most marine organisms rely on. One concern with ocean acidification is that the decreased seawater pH can lead to the decreased survival of shellfish and other aquatic life having calcium carbonate shells, as well as some other physiological challenges for marine organisms.

To avoid dangerous climate change, the international Paris Agreement aims to limit the increase in global average temperature to no more than 1.5° C. to 2° C. above the temperatures of the pre-industrial era. Global average temperatures have already increased by between 0.8° C. and 1.2° C. The Intergovernmental Panel on Climate Change (IPCC) estimates that a 'carbon budget' of about 500 $GtCO_2$ (billion tons of carbon dioxide), which corresponds to about ten years at current emission rates, provides a 66% chance of limiting climate change to 1.5° C.

In addition to cutting $CO_2$ emissions by curtailing the use of fossil fuels, climate models predict that a significant deployment of Negative Emissions Technologies (NETs) will be needed to avoid catastrophic ocean acidification and global warming beyond 1.5° C. (see "Biophysical and economic limits to negative $CO_2$ emissions", Smith P. et al., Nat. Clim. Chang. 2016; 6:42-50). Current atmospheric $CO_2$ and other greenhouse gas concentrations are already at dangerous levels, so even a drastic reduction in greenhouse gas emissions would merely curtail further increases, not reduce atmospheric greenhouse gas concentrations to safe levels. Moreover, the reduction or elimination of certain greenhouse gas sources (e.g., emissions from long distance airliners) would be extremely disruptive and/or expensive and are therefore unlikely to occur soon.

Therefore, there is a need to supplement emission reductions with the deployment of NETs, which are systems/processes that serve to reduce existing atmospheric greenhouse gas concentrations by, for example, capturing/removing $CO_2$ from the air and sequestering it for at least 1,000 years. The need for NETs may be explained using a bathtub analogy in which atmospheric $CO_2$ is represented by water contained in a bathtub, ongoing $CO_2$ emissions are represented by water flowing into the tub, and NETs are represented by processes that control water outflow through the tub's drain. In this analogy, reduced $CO_2$ emission rates are represented by partially turning off the water inflow tap—the slower inflow rate provides more time before the tub fills, but the tub's water level will continue to rise and eventually overflow. Using this analogy, although reducing $CO_2$ emissions may slow the increase of greenhouse gas in the atmosphere, critical concentration levels will eventually be reached unless NETs are implemented that can offset the reduced $CO_2$ emission level (i.e., remove atmospheric $CO_2$ at the same rate it is being emitted). Moreover, because greenhouse gas concentrations are already at dangerous levels (i.e., the tub is already dangerously full), there is an urgent need for NETs that are capable of significantly reducing atmospheric $CO_2$ faster than it is being emitted to achieve safe atmospheric concentration levels (i.e., outflow from the tub's drain must be greater than the reduced inflow from the tap to reduce the tub's water to a safe level).

NETs can be broadly characterized as Direct Air Capture (DAC) approaches and Ocean Capture approaches. DAC approaches utilize natural (e.g., reforestation) and technology-based methods to extract CO: directly from the atmosphere. Ocean capture approaches utilize various natural and/or technological processes to remove CO: from the atmosphere and store it in the ocean as bicarbonate, a form of carbon storage that is stable for over 10,000 years.

Electrochemical ocean alkalinity enhancement (OAE) represents an especially promising ocean capture approach that both reduces atmospheric $CO_2$ and mitigates ocean acidification by generating an ocean alkalinity product (i.e., an aqueous alkaline solution containing a fully dissolved base substance) and supplying the ocean alkalinity product to ocean seawater at a designated outfall location. A typical land based OAE system utilizes an ion exchange (IE) stack to perform an electrochemical (salt-conversion) process during which salt (sodium chloride (NaCl)) supplied in an aqueous salt feedstock solution (e.g., seawater or brine) is converted into the desired base substance (sodium hydroxide (NaOH) and an acid substance (hydrochloric acid (HCl). Note that the base substance leaving the IE stack is fully dissolved in an aqueous base solution. The OAE system then processes the aqueous base solution to generate the ocean alkalinity product (e.g., by diluting the aqueous base solution with seawater until the base substance concentration is at a level that does not endanger ocean sealife). When the ocean alkalinity product is subsequently supplied to an ocean, the base substance diffuses (disperses) into the surrounding seawater to serve two purposes: first, to directly reverse ocean acidification (i.e., by increasing the ocean seawater's alkalinity); and second, to indirectly reduce atmospheric $CO_2$ (i.e., increasing the ocean seawater's alkalinity increases the ocean's ability to absorb/capture atmospheric $CO_2$. Note that, because the base substance is fully dissolved in the ocean alkalinity product, the electrochemical OAE approach avoids problems associated with other OAE approaches (e.g., dissolution kinetics issues that are associated with conventional mineral OAE approaches).

As mentioned above, in addition to the desired NaOH base substance, OAE systems generate a significant amount of acid substance (HCl) as a byproduct of the electrochemical salt-conversion process (i.e., a typical land based OAE system produces on the order of 100 m³ of HCl per day, and potentially much more). Note that most of the NaOH base substance is typically supplied directly to the ocean to perform the useful purpose of decreasing ocean acidification and capture atmospheric $CO_2$, and that any retained base substance can be easily and safely stored in on-site storage containers (i.e., NaOH is relatively non-volatile). In contrast, the HCl acid substance generated by an OAE system's BPED may be both hazardous and serves no direct purpose in the OAE process, and therefore poses a significant on-site storage problem.

There are two possible ways to deal with the acid substance generated by an OAE system: moving/transporting the acid substance from the OAE system site to a designated location (e.g., a suitable storage/processing facility), or neutralizing the acid substance on-site. Transporting large amounts of HCl requires specialized storage containers and transportation systems and is typically considered to be dangerous and very expensive. On-site acid neutralization involves utilizing resources located adjacent to the OAE system to receive the acid substance as it leaves the IE stack, and to convert the acid substance into salt and water. On-site acid neutralization is considered safer and cheaper than the transporting option because it minimizes the storage and handling of the hazardous acid substance, and because (in some cases) the product of the acid neutralization process (i.e., salt and water) may be utilized by the OAE system. Moreover, because the widespread acceptance of OAE systems as a suitable NET may be predicated on minimizing each OAE system's cost per unit of captured/removed atmospheric $CO_2$ (LCOC), and because the cost of dealing with the acid substance is a component of an OAE system's LCOC, there is a strong motivation to implement on-site acid neutralization processes/systems. As mentioned above, acid neutralization generally involves mixing the acid substance with base (alkaline) materials under conditions that convert the acid molecules into salt and water molecules. Conventional acid neutralization processes typically involve reacting the acid substance with a base (alkaline) material such as NaOH, potassium hydroxide (KOH) or calcium carbonate ($CaCO_3$). Note that the NaOH base substance generated by an OAE system is earmarked for use in capturing atmospheric carbon and mitigating ocean acidification, so it would be counterproductive to neutralize the HCl generated by an OAE system using NaOH. KOH is typically produced in a manner similar to the electrochemical process performed by the IE stack (i.e., by electrolysis of a potassium chloride solution), and is therefore a relatively expensive base material. In contrast to other alkaline materials, $CaCO_3$ and $Ca(OH)_2$ can be easily extracted from several alkaline material sources (e.g., $CaCO_3$ from limestone and oyster shells and $Ca(OH)_2$ from unhardened concrete) that may be located near typical OAE system deployment locations, and therefore provides a cost-effective and readily available alkaline material for the acid neutralization process.

A further requirement for OAE system acid neutralization is that it achieves a zero (or very small) carbon and greenhouse gas footprint. Unfortunately, many readily available sources of alkaline material (e.g., unhardened concrete and other materials containing calcium carbonate $CaCO_3$, such as limestone and oyster shells) contain captured $CO_2$. This presents a problem because, when such alkaline materials are utilized in conventional acid neutralization approaches, the captured $CO_2$ is typically released into the atmosphere (i.e., atmospheric $CO_2$ is increased, thus generating a significant carbon footprint). Similarly, when another conventional base is used for acid neutralization, production of the conventional base is associated with a significant carbon footprint (e.g., in case of KOH, about 1.9 kg $CO_2$ e/kghttps:// apps.carboncloud.com/climatehub-/productreports/id/ 1394351136979, and this amount does not include the $CO_2$ footprint associated with transporting the conventional base to the OAE system location). The unnecessary generation/ release of $CO_2$ should be avoided in all cases, but this goal is particularly important when neutralizing the acid product generated by an OAE system (i.e., because the main purpose of an OAE system is to reduce atmospheric $CO_2$).

In view of the above issues, what is needed is a safe and effective acid neutralization apparatus/method that is capable of neutralizing acid (e.g., produced by an associated OAE system or another source) in a manner that minimizes costs and avoids the release of CO: into the atmosphere.

SUMMARY OF THE INVENTION

In an embodiment an ocean alkalinity enhancement (OAE) system includes a bipolar electrodialysis device (BPED) that electrochemically processes salt to generate an ocean alkalinity product and an acid byproduct including an acid substance (e.g., hydrochloric acid (HCl)), and an acid neutralization subsystem that utilizes an aqueous alkaline fluid to neutralize the HCl. As in conventional OAE systems, the BPED is configured to supply the ocean alkalinity product to an ocean, whereby the OAE system both reduces atmospheric carbon dioxide (CO) and mitigates ocean acidification. The acid neutralization subsystem either receives the aqueous alkaline fluid from an external source, or generates the aqueous alkaline fluid (e.g., by utilizing a crusher/grinder to process and mix an alkaline material with water). The acid neutralization subsystem then utilizes a reaction apparatus to mix (combine) a portion of the aqueous alkaline fluid and a portion of the acid byproduct such that, in the resulting mixture (referred to herein as a process fluid), the HCl supplied in the acid byproduct is neutralized by interactions with the alkaline material supplied in the aqueous alkaline fluid. According to an aspect, a neutralization controller utilizes one or more sensors one or more flow control devices to control the amount (flow rate) of aqueous alkaline fluid and/or acid byproduct entered into the reaction apparatus such that the process fluid is maintained at or above a predetermined target pH level at which (i) the amount of un-neutralized HCl in the reaction apparatus (i.e., the HCl neutralization rate) is maximized, and (ii) the generation and release of carbon dioxide from the reaction apparatus into the atmosphere is prevented. The predetermined target pH level is a function of various conditions of the process fluid such as temperature, salinity, dissolved inorganic carbon (DIC), etc., and corresponds to the lowest pH level at which $CO_2$ is reliably retained within the process fluid (i.e., $CO_2$ may be released from the process fluid if its pH level falls below the predetermined target pH level). Note that $CO_2$ is derived from carbon and oxygen atoms that are present in the aqueous alkaline fluid and are maintained in either a $HCO_3-$ ionic state or a $CO^2{}_3-$ ionic state when the process fluid pH level is maintained above the predetermined target pH level. If too much acid byproduct is added into reaction apparatus (i.e., such that the pH level of process fluid falls below pH8), the $HCO_3-$ and/or $CO^2_3-$ molecules will shift in equilibrium to dissolved carbon dioxide, and the carbon dioxide molecules can escape from the process fluid into the atmosphere in the form of $CO_2$ gas. Therefore, by controlling the amount of aqueous alkaline fluid and/or acid byproduct entered into the reaction apparatus such that the process fluid's pH level is maintained above the predetermined target pH level, the carbon and oxygen atoms remain in the $HCO_3-$ and/or $CO^2_3-$ ionic states and the generation of $CO_2$ is prevented. In this way, the present invention provides a safe and effective acid neutralization apparatus/method that is capable of neutralizing the HCl produced by an OAE system in a manner that minimizes costs and avoids the release of $CO_2$ into the atmosphere, thereby maximizing the OAE system's ability to reduce existing atmospheric greenhouse gas concentrations (i.e., by preventing the release of $CO_2$ during the acid neutralization process, which would otherwise offset at least some of the OAE system's ocean-based carbon capture).

In some embodiments the acid neutralization subsystem utilizes a reaction tank and a circulation line to increase the rate of acid neutralization by promoting interaction between the injected acid substance and alkaline material disposed in the process fluid. The circulation line generally includes one or more conduits (pipes) and a pump that combine to draw process fluid from a lower (or upper) end of the reaction tank through the conduits and to then return the circulated process fluid to an upper (or lower) end of the reaction tank. In some embodiments the reaction tank functions to receive incoming aqueous alkaline fluid and water (or other aqueous fluid) such that the incoming fluids are immediately mixed with previously formed process fluid (e.g., process fluid that has already passed through the circulation line and returned to the reaction tank). For descriptive purposes, the portion of the process fluid stored in the reaction tank at a given point in time is sometimes referred to herein as a first process fluid portion, and the portion of the process fluid second portion disposed in the circulation line at that given point in time is referred to as a second process fluid portion. In some embodiments, one or more in-line mixers is/are operably coupled to the circulation line such that process fluid enters an inlet end of each in-line mixer, and a flow control device (e.g., an acid dosing pump) injects acid byproduct by way of an injector into the inlet end of the in-line mixer, whereby the injected acid byproduct is mixed into the inflowing process fluid as both fluids pass through the in-line mixer. In some embodiments, one or more sensors is/are configured to (periodically or continuously) measure a (first) pH level of the second process fluid portion located upstream of the in-line mixer, and the neutralization controller is configured to control the flow control device such that a (second) pH level of the second process fluid portion located downstream of the in-line mixer remains equal to or greater than the target pH level.

In some embodiments the acid neutralization subsystem utilizes multiple sensors and corresponding fixed injector to maximize the rate at which acid substance is neutralized. The sensors are fixedly mounted inside the reaction tank such that each sensor is positioned to detect process fluid pH level in an associated region of the reaction tank. The corresponding fixed injectors are mounted on rods or other protruding structures that extend through an outer wall of the reaction tank such that each injector is positioned to inject acid byproduct into an associated region of the reaction tank. During operation, when a given sensor detects a portion of the process fluid having a relatively high pH level (i.e., significantly above with target pH level), the acid dosing subsystem is operated such that a calculated dose of acid byproduct is injected into the detected high pH process fluid portion that increases the rate of acid neutralization without reducing the portion's pH level below the predetermined target pH level. By utilizing multiple sensors to detect high pH process fluid regions and multiple injects to inject acid byproduct into each detected high pH process fluid region in this manner, the acid neutralization subsystem is able to maximize the acid neutralization rate while avoiding the undesirable release of $CO_2$.

In some embodiments the neutralization subsystem utilizes an agitator mechanism to stir process fluid disposed in the reaction tank in order to increase the rate of acid neutralization by promoting interaction between the acid substance and alkaline material disposed in the process fluid. In some embodiments the agitator mechanism includes a drive shaft that extends downward into a central region of the reaction tank, one or more support rods that extending radially from the drive shaft, and one or more agitator blades attached to the one or more support rods. With this arrangement, when the drive shaft is rotated (e.g., by a drive motor) around its axis, the agitator blade(s) are moved through the process fluid (i.e., by way of attachment to the support rod(s)), whereby the agitator blade(s) act as paddles to stir the process fluid disposed in the reaction tank.

In some embodiments one or more of the pH sensors is/are disposed on the rotating arms (support rods) of an agitator mechanism such that the sensor(s) move along a circular path in the reaction tank and are able to detect process fluid regions having relatively high pH values. In some embodiments one or more injector(s) is/are also disposed on each rotating arm such that each injector moves along substantially the same circular path adjacent as the sensors, thereby facilitating the injection/distribution of acid product into each detected process fluid region having relatively high pH values (i.e., by timing each injection to coincide with each injector's presence in or adjacent to the detected process fluid regions). In some embodiments one or more sensors are disposed on the agitator mechanism rotating arms, but acid byproduct is injected into associated regions of the reaction tank by way of fixed injectors that are extended into the reaction tank by corresponding rods or other protruding structures. In each of these embodiments, mounting sensors on the rotating arms (support rods) of an agitator mechanism facilitates the detection of process fluid regions having relatively high pH values using one or a small number of sensors, thereby reducing total system costs and simplifying system operations.

In some embodiments the acid neutralization sub-system further includes a comminutor (e.g., an in-line grinder, macerator or other pulverizing apparatus) that is operably coupled to the circulation line (fluid conduits) and is configured to reduce a particle size of grit contained in the process fluid (e.g., by filtering out larger particles and grinding them into smaller particles before returning them to the circulating process fluid). In other embodiments in which metal or hazardous elements may be disposed in the readily available alkaline material, the acid neutralization sub-system further comprises a flocculant feed mechanism configured to supply a flocculant material (e.g., chitosan) into the reaction tank, and a suitable removal system configured to remove from the process fluid sediments formed by metals and other elements bound to the flocculant material (e.g., by way of passing the circulating process fluid through an appropriate filter).

BRIEF DESCRIPTION OF THE DRAWINGS

These and other features, aspects and advantages of the present invention will become better understood with regard to the following description, appended claims, and accompanying drawings, where:

FIGS. 5A, 5B, 5C, 5D, 5E and 5F are top views showing a reaction apparatus of the acid neutralization subsystem of FIG. 4A during an exemplary acid neutralization process;

DETAILED DESCRIPTION OF THE DRAWINGS

The present invention relates to an improvement in methods and apparatus/systems for ex-situ acid neutralization, and more specifically to the ex-situ neutralization of acid generated by an OAE system. The following description is presented to enable one of ordinary skill in the art to make and use the invention as provided in the context of a particular application and its requirements. As used herein, directional terms such as "upper" and "lower", are intended to provide relative positions for purposes of description and are not intended to designate an absolute frame of reference. Various modifications to the preferred embodiment will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed.

Figure 1:
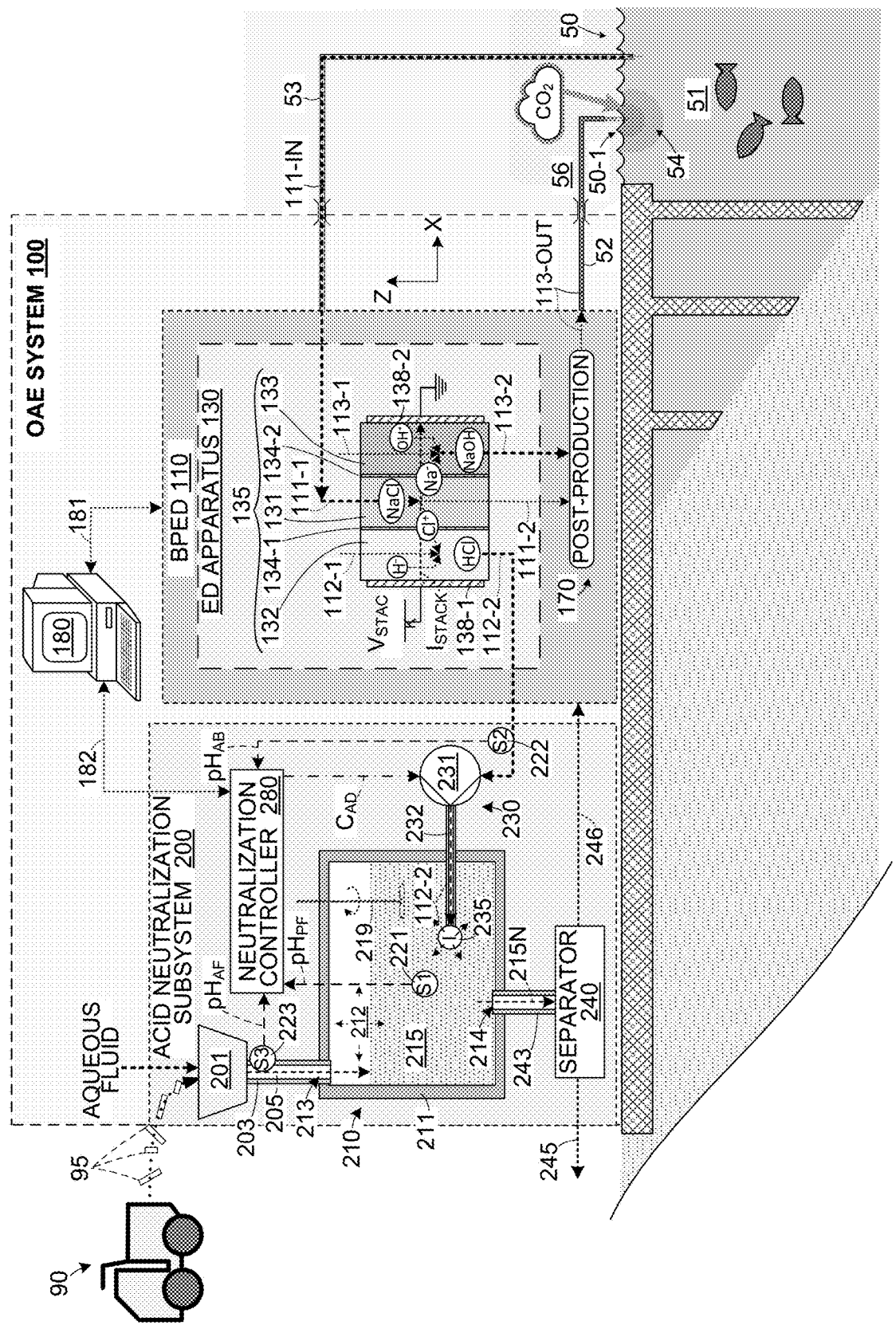
FIG. 1 is a diagram depicting a generalized OAE system including an acid neutralization subsystem according to an embodiment.

FIG. 1 shows a generalized OAE system 100 including a bipolar electrodialysis device (BPED) 110, a system controller 180 and an acid neutralization subsystem 200.

BPED 110 generally includes an electrodialysis (ED) apparatus 130, one or more post-production devices 170 and flow control resources (not shown in FIG. 1). As described in additional detail below, ED apparatus 130 functions to electrochemically process (convert) salt (NaCl) provided in feedstock solution 111-IN into a base substance (NaOH) that is fully dissolved in an aqueous base product 113-2 and an acid substance (HCL) disposed in an aqueous acid byproduct 112-2. Post-production devices 170 is configured to generate ocean alkalinity product 113-OUT using base product 113-2 generated by ED apparatus 130, and to supply ocean alkalinity product 113-OUT to ocean 50 in a way that both reduces atmospheric carbon dioxide $CO_2$ and mitigates ocean acidification. In this way, BPED 110 electrochemically processes salt provided in feedstock solution 111-IN to generate ocean alkalinity product 113-OUT containing NaOH and acid byproduct 112-2 containing HCl. In practical embodiments, BPED 110 generates and supplies a sufficient amount of ocean alkalinity product 113-OUT to increase the alkalinity of a designated region of ocean 50, thereby both reducing atmospheric carbon dioxide and mitigating ocean acidification. In some embodiments, feedstock solution 111-IN includes seawater 51 that is pumped directly from ocean 50 through an inflow transfer pipe 53. In other embodiments (not shown), feedstock solution 111-IN may comprise brine generated by a brine source (e.g., a desalination plant or a water recycling plant that processes seawater and generates brine as a byproduct). In these embodiments, to minimize the expense and resources required to transport both salt feedstock solution 111-IN and/or ocean alkalinity product 113-OUT between BPED 110 and ocean 50, it is desirable to locate (position) OAE system 100 as close as possible to ocean 50.

ED apparatus 130 generally includes an ion exchange (IE) stack 135 that is disposed between two electrodes (i.e., anode 138-1 and cathode 138-2). IE stack 135 typically includes multiple cells arranged in series between electrodes 138-1 and 138-2, where each cell includes three chambers that respectively serve as parallel flow channels for the aqueous salt, acid and base solutions as they pass through IE stack 135. For brevity and clarity, only one cell of IE 135 is depicted in FIG. 1, which is made up of a salt chamber 131 that functions to channel a portion of the salt feedstock solution, an acid chamber 132 that channels a portion of the aqueous acid solution, and a base chamber 133 that channels a portion of the base solution. Each cell's salt chamber 131 is disposed between and separated from the cell's acid chamber 132 and base chamber 133 by corresponding ion exchange membranes 134-1 and 134-2, which are configured to facilitate the transfer of sodium and chloride ions from the salt chamber into the base and acid chambers during the electrochemical process as described below. Electrodialysis apparatus 130 also includes manifold or other structures (not shown) that are configured to cooperate with the flow control resources of BPED 110 to direct the three different (i.e., a salt feedstock, acid and base) aqueous solutions through corresponding salt/acid/base chambers of IE stack 135. Specifically, the aqueous salt feedstock solution enters IE stack 135 as a strong salt stream 111-1 that is divided and directed (e.g., by an input manifold, not shown) into the inlet of each cell's salt flow channel 131, and the aqueous salt feedstock solution exits the IE stack 135 by way of an outlet of each cell's salt flow channel 131 (and an outlet manifold, not shown) as a weak (depleted) salt stream 111-2. Similarly, the aqueous acid solution enters IE stack 135 as a weak acid stream 112-1 that is directed into the inlet of each cell's acid flow channel 132 and exits the IE stack 135 by way of an outlet of each cell's acid flow channel 132 as a strong acid stream (acid byproduct) 112-2. Finally, the aqueous base solution enters IE stack 135 as a weak base stream 113-1 that is directed into the inlet of each cell's base flow channel 133 and exits the IE stack 135 by way of an outlet of each cell's base flow channel 133 as a strong base stream (base product) 113-2.

ED apparatus 130 performs the electrochemical process when the three aqueous solutions are directed through IE stack 135 along parallel flow paths (e.g., parallel to the Z-axis direction) while a stack voltage $V_{STACK}$ is applied to electrodes 138-1 and 138-2. When stack voltage $V_{STACK}$ is sufficiently strong, the resulting electric field produces an ionic current across IE stack 135 in a direction perpendicular to the parallel flow paths (e.g., in the X-axis direction), whereby anions in the aqueous salt/base/acid solution streams (e.g., chloride ions (Cl⁻) and hydroxide ions (OH⁻)) move toward anode 138-1 and cations in the aqueous solution streams (e.g., sodium ions (Nat) and protons (H⁺)) move toward the cathode 138-2. This ionic current causes dissociated salt molecules (i.e., sodium ions (Na⁺) and chloride ions (Cl⁻)) to exit strong salt stream 111-1 in opposite directions (i.e., such that the chloride ions (Cl⁻) pass through ion exchange filter 138-1 from salt chamber 131 into the acid chamber 132, and the sodium ions (Nat) pass through ion exchange filter 138-2 into base chamber 133). The chloride ions (Cl⁻) then combine with protons (H⁺) to form "new" acid (HCl) molecules in the acid solution stream flowing through acid chamber 132, and the sodium ions (Na⁺) combine with hydroxide ions (OH⁻) to form "new" base (NaOH) molecules in the base solution stream flowing through base chamber 133. As a result of this electrochemical salt-conversion process, strong base stream (base product) 113-2 exits each cell's base chamber 133 with a significantly higher concentration of base substance than that of weak base stream 113-1 (i.e., as it enters IE stack 135). Similarly, strong acid stream (acid byproduct) 112-2 exiting each cell's acid chamber 132 has a higher concentration of acid substance than that of weak acid stream 112-1. Note that, because salt is converted (consumed) to generate the acid and base substances, weak/depleted salt solution stream 111-2 exiting each cell's salt chamber 131 has a lower salt content than strong salt feedstock stream 111-1 (i.e., as it enters IE stack 135).

As indicated below IE stack 135, post-production device 170 receives portions of one or more of the aqueous solution streams leaving IE stack 135 and is configured to generate ocean alkalinity product 113-OUT using the base substance provided in at least a portion of strong base stream 113-2, and to supply ocean alkalinity product 113-OUT to ocean 50 at an outfall location 50-1.

Additional information regarding the configuration and operation of BPED 110 is provided in co-owned and co-pending U.S. patent application Ser. No. 18/131,839, filed Apr. 6, 2023, entitled PRODUCTION EFFICIENCY OPTIMIZATION FOR BIPOLAR ELECTRODIALYSIS DEVICE, which is incorporated herein by reference in its entirety.

Referring to the upper central portion of FIG. 1, system controller 180 can be an electronic device (e.g., a computer/processor or dedicated electronic device) that implements software-based instructions or is otherwise configured to execute various system-related software-based programs including a BPED operating method that controls the operations performed by BPED 110 by way of control signals 181, and may execute other control algorithms/processes that control the operations of other system devices (not shown). In some embodiments, system controller 180 is configured to coordinate operations of BPED 110 and acid neutralization subsystem 200 (e.g., by way of control signals 182) such that acid neutralization subsystem 200 operates as described below to neutralize HCl immediately after being generated by the BPED 110, thereby minimizing the amount of acid product that must be stored before it can be processed by acid neutralization sub-system 200, and minimizing or eliminating the safety danger and expense associated with prolonged storage or transportation of the hazardous acid byproduct 112-2. Such system-controller-to-neutralization-controller communications may include safety messages, for example, that cause the BPED 110 to terminate or reduce acid production operations when acid neutralization subsystem 200 may be experiencing technical failure.

Referring to the left side of FIG. 1, acid neutralization subsystem 200 generally includes a reaction apparatus 210, one or more sensors, a dosing (mixture control) apparatus 230, an optional separator 240 and a neutralization controller 280. Acid neutralization subsystem 200 receives acid byproduct 112-2 from BPED 110 and is configured to neutralize the acid substance (HCl) in acid byproduct 112-2 using an aqueous alkaline fluid (neutralizing agent) 205. In alterative embodiments acid neutralization subsystem 200 may be configured to neutralize acid using either a batch process or a continuously stirred-tank reactor (CSTR).

Referring to the upper left portion of FIG. 1, aqueous alkaline fluid 205 is a solution or slurry including ions from a suitable alkaline material 95. In some embodiments, alkaline material 95 may include one or more of: i) unhardened concrete (UHC); ii) concrete slurry; iii) mafic/ultra-mafic aggregates; iv) limestone/dolostone; v) mining tailings (e.g., bauxite residue, fly ash, or red mud); vi) alkaline paper mill waste; vii) waste from hydrometallurgy; and viii) oyster shells. As depicted by alkaline material transportation vehicle (e.g., dump truck) 90, in some embodiments alkaline material 95 is transported as a solid material to acid neutralization subsystem 200, and acid neutralization subsystem 200 includes an optional processing device 201 that is configured to generate aqueous alkaline fluid 205 by processing (e.g., crushing/grinding) alkaline material 95 and mixing the processed alkaline material with an aqueous fluid (i.e., pure water or an aqueous solution such as permeate (weak salt solution) 111-1, which is generated by BPED 110). In other embodiments, aqueous alkaline fluid 205 may be produced by another means and pumped or otherwise transported to acid neutralization subsystem 200. In either case, to minimize the expense and resources required to transport from a suitable alkaline source (i.e., either a quarry or other source of alkaline material 95 and/or a remote processing plant capable of generating aqueous alkaline fluid 205) to acid neutralization subsystem 200, it is desirable to locate (position) OAE system 100 as close as possible to the suitable alkaline source.

Reaction apparatus 210 is configured to receive both aqueous alkaline fluid 205 and acid byproduct 112-2, thereby forming a process fluid 215 (i.e., a mixture of aqueous alkaline fluid 205 and acid byproduct 112-2) in which acid substance (HCl) disposed in the acid byproduct 112-2 is neutralized by interacting with the alkaline material 95 supplied in the aqueous alkaline fluid 205. In some embodiments, reaction apparatus 210 includes a reaction tank (container) 211 that operably provides a reaction chamber 212 capable of receiving a portion of aqueous alkaline fluid 205 through an inlet 213 by way of an inlet pipe 203, and capable of receiving a portion of acid byproduct 112-2 by way of a dosing apparatus 230 (described below). A (first) sensor 221 is disposed in reaction chamber 212 and configured to measure a pH level of process fluid 215 and to periodically or continuously generate a (first) sensor data signal $pH_{PF}$ including the measured process fluid pH level. In some embodiments, reaction apparatus 210 also includes a second sensor 222 that is operably disposed and configured to measure a pH level of acid byproduct 112-2 (i.e., before being injected into reaction apparatus 210 by acid dosing pump 231), and to generate a (second) sensor data signal $pH_{AB}$ including the measured acid byproduct pH level, and a third sensor 223 that is operably disposed and configured to measure a pH level of aqueous alkaline fluid 205 (i.e., before being supplied into tank 211), and to generate a (third) sensor data signal $pH_{AF}$ including the measured aqueous alkaline fluid pH level. As set forth below, one or more of sensor data signals $pH_{PF}$, $PH_{AF}$ and $pH_{AB}$ are transmitted to and utilized by neutralization controller 280 to generate target pH level and/or to control the operation of reaction apparatus 210 such that process fluid 215 remains equal to or greater than a target pH level. In some embodiments, one or more of sensors 221, 222 and 223 is further configured to measure one or more additional parameters (e.g., flow rate, temperature, etc.) associated with process fluid 215, acid byproduct 112-2, and/or aqueous alkaline fluid 205 and to generate/transmit corresponding data signals to neutralization controller 280, whereby neutralization controller 280 may utilize these additional data signals to calculate the target pH level and/or to control dosing apparatus 230.

Dosing apparatus 230 includes at least one flow control device that is configured to control a flow of at least one of acid byproduct 112-2 and aqueous alkaline fluid 205 into reaction chamber 212. For example, an acid dosing pump (flow control device) 231 is configured to inject unit quantities (doses) of acid byproduct 112-2 into reaction chamber 212 (e.g., by way of an injection pipe 232 and an injector 235), thereby controlling the flow rate of acid byproduct 112-2. In other embodiments (not shown in FIG. 1), dosing apparatus 230 may include a second flow control device that is operably positioned and configured to control the flow rate of acid byproduct 112-2 into reaction chamber 212.

Separator 240 is utilized in some embodiments to enhance the rate of acid neutralization of acid neutralization subsystem 200 by removing (separating) spent process fluid (e.g., neutralized product and/or undesirable material) 215N from the process fluid 215 disposed in reaction chamber 212. As indicated in FIG. 1, separator 240 may be configured to receive spent process fluid 215N by way of an outlet 214 and outlet pipe 243 that communicates between reaction chamber 212 and separator 240. In some embodiments separator 240 comprises a mechanism that functions to remove spent process fluid 215N using one or more of the following removal processes: filtration, flocculation, rectification, distillation, adsorption, absorption, evaporation, crystallization, electrodialysis, and electrophoresis. In some embodiments, solids 245 generated by the removal process are removed for disposal, and water 246 extracted from the spent fluid may reclaimed for use by BPED 110.

Neutralization controller 280 (e.g., a microprocessor) is configured to utilize sensor data signal $pH_{AF}$ (which is received from sensor 221 and indicates a current pH level of process fluid 215) to control dosing apparatus 230 (e.g., by utilizing acid dosing pump control signal $C_{AD}$ to actuate or not-actuate acid dosing pump 231) such that the pH level of process fluid 215 remains equal to or greater than a predetermined target pH level. As set forth above, the pH level of process fluid 215 is determined, for example, by the relative amounts of acid byproduct 112-2 and aqueous alkaline fluid 205 that are present in reaction chamber 212, whereby a relative increase in the proportion of acid byproduct 112-2 to aqueous alkaline fluid 205 causes a corresponding decrease in the pH level of process fluid 215, and a relative decrease in the proportion of acid byproduct 112-2 to aqueous alkaline fluid 205 causes a corresponding increase in the pH level of process fluid 215. By monitoring sensor data signal $pH_{AF}$ and controlling the relative rates at which aqueous alkaline fluid 205 and acid byproduct 112-2 are added to process fluid 215, neutralization controller 280 maintains the pH level of process fluid 215 at (equal to) or above (greater than) a predetermined target pH level. For example, if sensor data signal $pH_{AF}$ indicates the current pH level of process fluid 215 is decreasing and in danger of dropping below the target pH level, then neutralization controller 280 may transmit a corresponding acid dosing pump control signal $C_{AD}$ that causes acid dosing pump 231 to stop or slow the injection rate of acid byproduct 112-2 while aqueous alkaline fluid 205 continues to flow into reaction chamber 212, thereby allowing the pH level of process fluid 215 to stabilize at or increase above the target pH level. Similarly, if sensor data signal $pH_{AF}$ indicates the current pH level of process fluid 215 is significantly above the target pH level, then neutralization controller 280 may transmit a corresponding acid dosing pump control signal $C_{AD}$ that causes acid dosing pump 231 to increase the injection rate of acid byproduct 112-2 into reaction chamber 212, thereby causing the pH level of process fluid 215 to decrease toward the target pH level.

Figure 2:
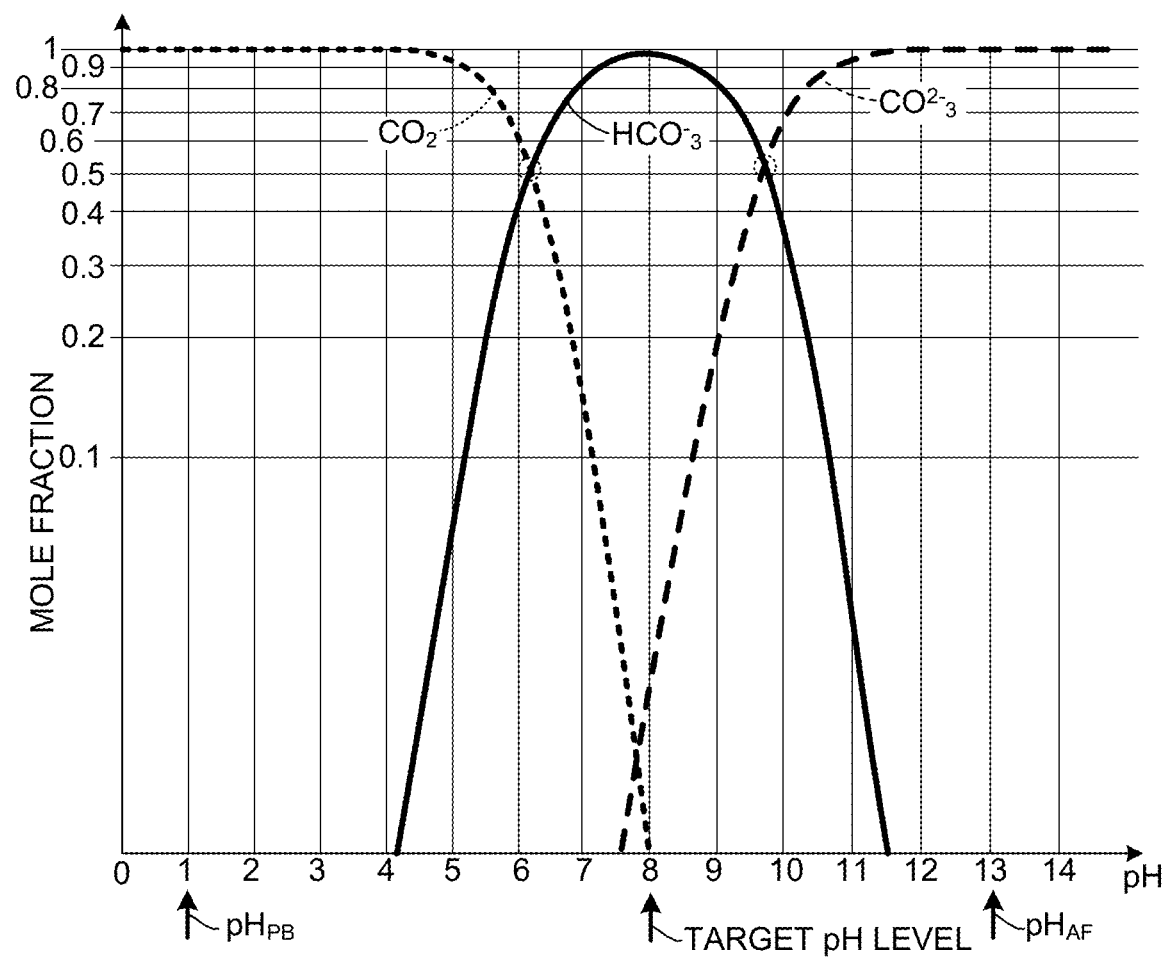
FIG. 2 is a graph depicting a target pH level according to an exemplary embodiment.

As used herein, the phrase "target pH level" refers to a minimum pH level of process fluid 215 at which (i) a neutralization rate of HCl in reaction apparatus 210 is maximized, and (ii) the generation and release of $CO_2$ from reaction apparatus 210 into the atmosphere is prevented. An exemplary target pH level is indicated in FIG. 2, which is a graph showing mole fraction versus pH values for $CO_2$, $HCO^-_3$ and $CO^{2-}_3$ for an exemplary process fluid. That is, $CO_2$ is derived from carbon and oxygen atoms, which are present in aqueous alkaline fluids (e.g., aqueous alkaline fluid 205, described above). As indicated in FIG. 2, these carbon and oxygen atoms are maintained in either a $HCO_3^-$ ionic state or a $CO^2_3{}^-$ ionic state when present in process fluids having relatively high pH levels, and form $CO_2$ when present in process fluids having relatively low pH levels. Note that, before mixing, an exemplary aqueous alkaline solution 205 has an initial pH level (indicated by $pH_{AF}$ in FIG. 2) equal to approximately pH13, and that the carbon and oxygen atoms in aqueous alkaline solution 205 are substantially entirely maintained in the $CO^2_3{}^-$ ionic state. By way of contrast, an exemplary acid byproduct (aqueous acid solution) 112-2 has an initial pH level (indicated by $pH_{AB}$ in FIG. 2) equal to approximately pH1, whereby any carbon and oxygen atoms present in acid byproduct 112-2 are substantially entirely maintained as $CO_2$. When mixed, the resulting process solution 215 has a pH level that is between the relatively low pH level of acid byproduct 112-2 and the relatively high pH level of aqueous alkaline fluid 205. When aqueous alkaline fluid 205 is mixed with acid byproduct 112-2 in reaction apparatus 210, a pH level $pH_{PF}$ of the resulting process fluid 215 is somewhere between the relatively high pH level of aqueous alkaline fluid 205 and the relatively low pH level of acid byproduct 112-2. As indicated in FIG. 2, if too much acid byproduct 112-2 is added into reaction apparatus 210 (i.e., such that the pH level of process fluid 215 falls below pH8), the $HCO_3^-$ and/or $CO^2_3{}^-$ molecules will shift in equilibrium to dissolved carbon dioxide, and the carbon dioxide molecules can escape from the process fluid into the atmosphere in the form of $CO_2$ gas. Thus, the target pH level for the example shown in FIG. 2 occurs at approximately pH8 because, when the process fluid's pH level is equal to (or greater than) this pH8, none of the carbon and oxygen atoms present in the process fluid form $CO_2$, and because the amount of acid substance in the process fluid (i.e., the acid neutralization rate) is maximized. Note that adding additional acid byproduct to the process fluid may increase the acid neutralization rate, but this would also cause the process fluid's pH level to fall below pH8, thereby causing the undesirable generation of $CO_2$. Conversely, when the process fluid pH level is substantially greater than the target pH level (e.g., approximately pH9), the undesirable generation of $CO_2$ is avoided (i.e., because all of the carbon and oxygen atoms in the process fluid are either in the $HCO_3^-$ ionic state or the $CO_3^{2-}$ ionic state), but the amount of acid substance available for neutralization is less than maximum.

Note that the target pH level of a given process fluid is determined by various process conditions such as temperature, salinity, dissolved inorganic carbon (DIC), etc., and corresponds to the lowest pH level at which $CO_2$ is reliably retained within the process fluid (i.e., $CO_2$ may be released from the process fluid if its pH level falls below the predetermined target pH level). For example, FIG. 2 shows mole fraction versus pH values for $CO_2$, $HCO_3^-$ and $CO^{2-}_3$, for an exemplary process fluid under the following conditions: T=20° C., salinity=0 ppt, depth=0 m, DIC=2000 μmol/kg, $pK_1$=6.16±7.41e-05, $pK_2$=9.53±7.41e-05, and indicates that, under these process conditions, the target pH level is equal to approximately pH8 (i.e., pH level 8). Under process conditions different from those utilized to generate the graph shown in FIG. 2, the target pH level may be higher or lower than pH8.

In some (perhaps idealized) embodiments, the available alkaline material used for acid neutralization (e.g., a base substance like sodium hydroxide, calcium carbonate and potassium oxide) is of a type and purity that reacts in a predictable manner with the hydrochloric acid, and the task of maintaining the acid neutralization process above pH8 may be achieved using stoichiometry. In this case, neutralization controller 280 may be configured to control the neutralization reaction such that a target pH value is maintained using a proportional-integral-derivative (PID) controller that calculates an error value as the difference between a desired setpoint (SP, e.g., the target pH level) and a measured process variable (PV, e.g., the $pH_{PF}$) and applies a correction (i.e., increases/decreases the flow of acid byproduct 112-2 into reaction apparatus 210) based on proportional, integral, and derivative terms.

In other (perhaps more practical) embodiments, the alkaline material used for acid neutralization is inhomogeneous (i.e., no stoichiometry is available). In this case, the objective of neutralization controller 280 is to inject/neutralize acid as quickly as possible yet at the same time be energy efficient and avoid the release of undesirable constituents that may reside within the inhomogeneous alkaline material (e.g., $CO_2$ and/or harmful elements). This problem may be addressed using a class of machine learning methods generally known as reinforcement learning, which is concerned with how intelligent agents ought to take actions in an environment in order to maximize the notion of cumulative reward. Model free learning control (aka Q learning) techniques are currently believed to provide the best reinforced learning option because they facilitate recognizing system dynamics associated with variations in the alkaline material that are not known or cannot be known in sufficient detail.

FIGS. 3A to 9 depict acid neutralization subsystems according to various exemplary specific embodiments utilizing additional features and methods that further enhance the benefits provided by acid neutralization subsystem 200 (FIG. 1). That is, OAE system 100 (FIG. 1) may be modified to replace acid neutralization subsystem 200 with one of the acid neutralization subsystems described below with reference to FIGS. 3A to 9 or may be modified to include one or more of the acid neutralization subsystem features described below with reference to FIGS. 3A to 9. In each case, the modified OAE system would exhibit both the benefits of acid neutralization subsystem 200 (described above) and the additional benefits of any included feature(s).

Figure 3A:
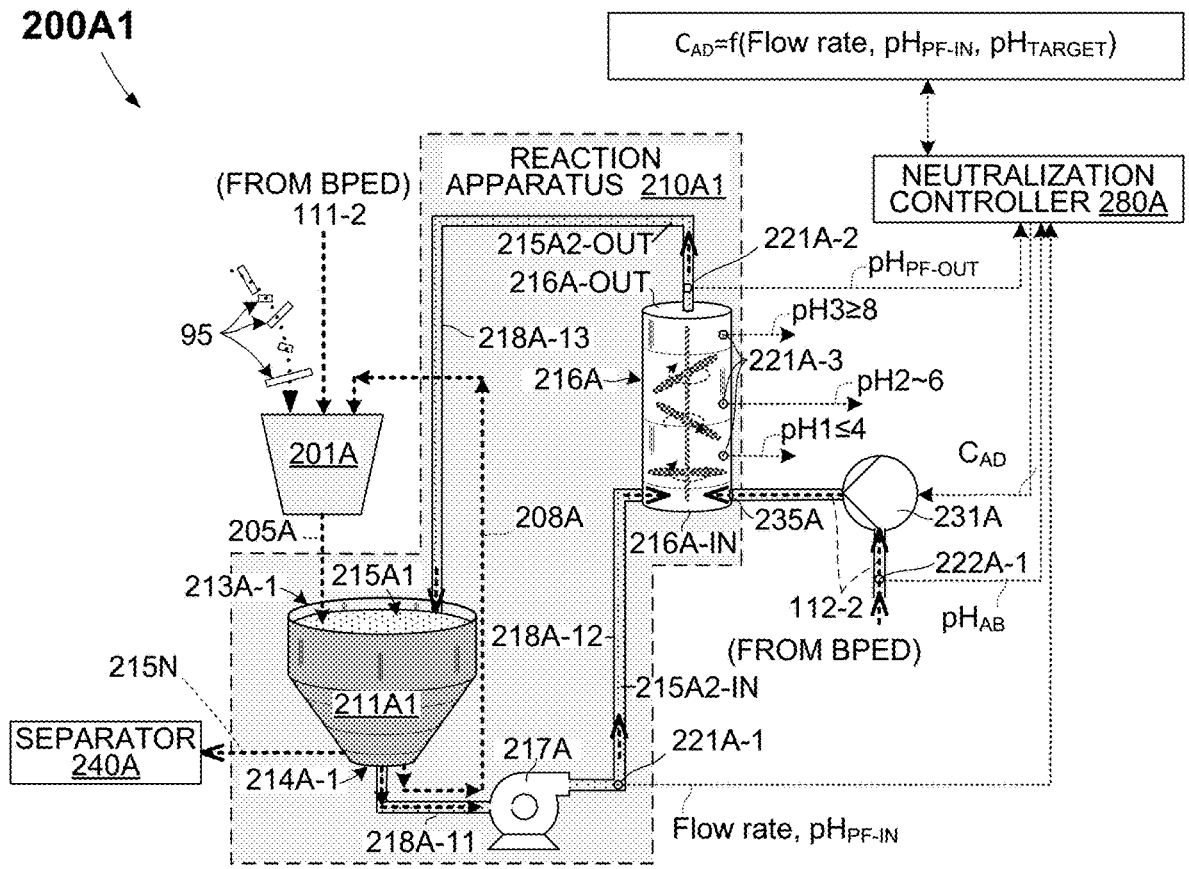
FIGS. 3A and 3B are diagrams depicting exemplary acid neutralization subsystems according to alternative specific embodiments.

FIG. 3A depicts an acid neutralization subsystem 200A1 according to a first exemplary specific embodiment. Like acid neutralization subsystem 200 (FIG. 1), acid neutralization subsystem 200A1 includes an optional processing device 201A that is configured to generate aqueous alkaline fluid 205A by processing alkaline material 95 and mixing with permeate (aqueous fluid) 111-1 and utilizes a separator 240A to process spent fluid 215N. Acid neutralization subsystem 200A1 includes a reaction apparatus 210A1, a neutralization controller 280A and sensors that differ from corresponding structures of acid neutralization subsystem 200 (FIG. 1) in the manner set forth below.

Reaction apparatus 210A1 includes a reaction tank 111A, an in-line mixer 216A, a pump 217A and a circulation line formed by fluid conduits (pipe sections) 218A-11, 218A-12 and 218A-13. Reaction tank 111A functions to receive and store a (first) portion of process fluid 215A1. In some embodiments, grit 208A can be recirculated (as indicated by the dashed-line arrow) from tank 211A1 to processing device 201A to continuously reduce the particle size of alkaline material disposed in process fluid 215A1, thereby increasing the surface area of the alkaline material for reaction with the acid substance. Fluid conduits (pipe sections) 218A-11 to 218A-13 form a circulation line that extends between a lower end portion 214A-1 of reaction tank 211A1 and an upper end portion 213A-1 of reaction tank 211A1 and passes through pump 217A and in-line mixer 216A. In some embodiments pump 217A is a slurry pump configured to transfer (pump) a second portion of the process fluid (i.e., a portion that is temporarily not disposed in reaction tank 211A1) from lower end portion 214A-1 through in-line mixer 216A and then to upper end portion 213A-1 of reaction tank 211A1. Specifically, a first conduit 218A-11 is configured to transfer the second process fluid portion from lower end portion 214A-1 of reaction tank 211A1 to an inlet of pump 217A, a second conduit 218A-12 is configured to transfer the second process fluid portion from an outlet of pump 217A to an inlet end 216A-IN of in-line mixer 216A, and a third conduit 218A-12 is configured to transfer the second process fluid portion from an outlet end 216A-OUT of in-line mixer 216A to upper end portion 213A-1 of reaction tank 211A1. For descriptive purposes, the process fluid flowing in the portion of the circulation line located upstream of in-line mixer 216A (e.g., disposed in conduits 218A-11 and 218A-12) is referred to as process fluid-in 216A2-IN, and the process fluid flowing in the portion of the circulation line located downstream from in-line mixer 216A (e.g., disposed in conduit 218A-13) is referred to as process fluid-out 216A2-OUT. In some embodiments, the circulation line formed by conduits 218A-1 to 218A-3 and pump 217A may be utilized to enhance mixing and to facilitate the removal of spent or otherwise undesirable material from the fluid (e.g., by way of feeding spent fluid to separator 240A).

Similar to acid neutralization subsystem 200 (FIG. 1), acid neutralization subsystem 200A1 utilizes at least one sensor 221A-1 to measure a pH level of the process fluid, and neutralization controller 280A utilizes the corresponding sensor data signal $pH_{PF-IN}$ to control the injection rate of acid byproduct 112-2 into reaction apparatus 210A1 by controlling an acid dosing pump (flow control device) 231A by way of acid dosing control signal $C_{AD}$. In one embodiment, sensor 221A-1 is configured to measure both a (first) pH level and a volumetric flow rate of second process fluid portion 215A2-IN located upstream of in-line mixer 216A (e.g., as the process fluid flows along second conduit 218A-12), and neutralization controller 280A utilizes both the pH sensor data $pH_{PF-IN}$ and the flow rate data to calculate a required acid byproduct injection rate (e.g., dose quantity per minute) and to generate the corresponding acid dosing control signal $C_{AD}$ such that acid dosing pump 231A injects acid byproduct 112-2 at the calculated acid byproduct injection rate by way of an injector 235A positioned near inlet end 216A-IN of in-line mixer 216A. In one embodiment, neutralization controller 280A is configured to control acid dosing pump (flow control device) 231A by way of acid dosing control signal $C_{AD}$ such that a (second) pH level $pH_{PF-OUT}$ Of second process fluid portion 215A-OUT located downstream of in-line mixer 216A (e.g., as the process fluid flows along third conduit 218A-13) remains equal to or greater than the predetermined target pH level. In some embodiments, an additional sensor 222A-1 is utilized to measure a pH level of acid byproduct 112-2 and to generate a corresponding sensor data signal $pH_{AB}$, and (as indicated in the block provided in the top right corner of FIG. 3A) neutralization controller 280A is configured to calculate control signal $C_{AD}$ as a function of (i) the flow rate (volume) and pH level ($pH_{PF-IN}$) of incoming process fluid 215A2-IN, (ii) the pH level ($pH_{AB}$) of acid byproduct 112-2, and (iii) the target pH level of outgoing process fluid leaving in-line mixer 216A. In one embodiment, the function of in-line mixer 216A may be implemented by a plug flow reactor, but this approach may significantly increase the amount of water required to perform the acid neutralization process.

In some embodiments, acid neutralization subsystem 200A1 utilizes one or more additional sensors to generate pH measurement data that may be used by neutralization controller 280A as feedback for machine learning purposes. In one such embodiment, a second sensor 221A-2 is positioned and configured to measure a pH level $pH_{PF-OUT}$ of second process fluid portion 215A-OUT located downstream of in-line mixer 216A, whereby measured process fluid pH level $pH_{PF-OUT}$ may be used to verify that second process fluid portion 215A-OUT has achieved a target pH level after passing through in-line mixer 216A. In some embodiments, one or more intermediate sensors 221A-3 may be positioned to measure the mixture of process fluid and acid byproduct as it flows from inlet end 216A-IN to outlet end 216A-OUT of in-line mixer 216A. As indicated by exemplary measured intermediate pH values pH1 to pH3, low pH levels may occur within in-line mixer 216A, for example, during the initial interaction between process fluid portion 215A-IN and the injected acid byproduct 112-2, whereby $CO_2$ may be temporarily generated. An advantage to utilizing the configuration shown in FIG. 3A is that, because in-line mixer 216A and conduit 218A-23 form an enclosed structure, any $CO_2$ generated within in-line mixer 216A due to low pH levels cannot escape to the atmosphere, and the carbon and oxygen atoms are reconverted into the $HCO_3^-$ and/or $CO_3^{2-}$ ionic states when the process fluid's pH level increases to the target pH level when it reaches outlet end 216A-OUT of in-line mixer 216A.

Figure 3B:
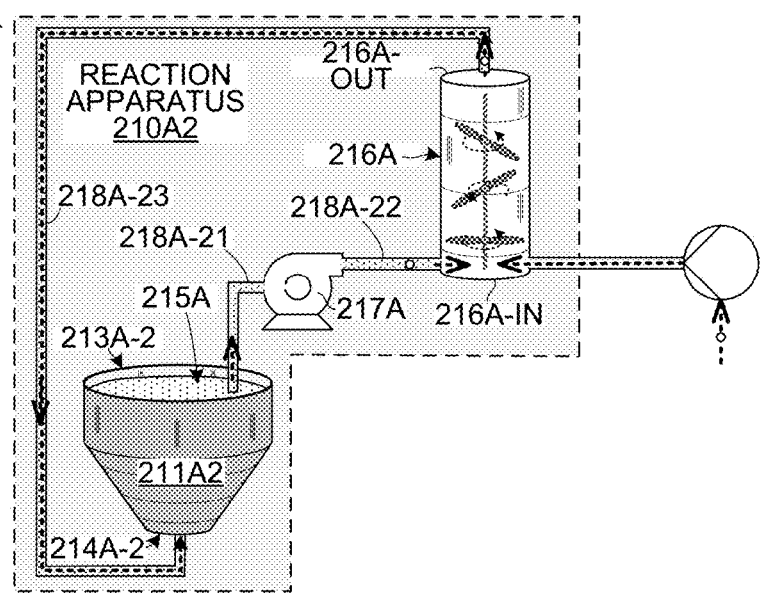

FIG. 3B depicts an acid neutralization subsystem 200A2 according to a simplified alternative exemplary specific embodiment. Note that several system features, such as an optional processing device, a separator, and a neutralization controller, are omitted from FIG. 3B for clarity and brevity. Acid neutralization subsystem 200A2 includes a reaction apparatus 210A2 having a reaction tank 211A2, pump 217A and in-line mixer 216A and a circulation line that are configured and operate similar to acid neutralization subsystem 200A1 (FIG. 3A) but differs in that the circulation line of reaction apparatus 210A2 is reversed (i.e., such that the flow of process fluid out of and into reaction tank 211A2 is opposite to the configuration utilized by reaction apparatus 210A1). In particular, process fluid 215A is drawn through a first conduit section 218A-21 from upper end 213A-2 of reaction tank 211A2 by pump 217A, then pumped by way of second conduit section 218A-22 into inlet end 216A-IN of in-line mixer 216A, then from outlet end 216A-2 along third conduit section 218A-23 to lower end 214A-2 of reaction tank 211A-2. Possible advantages provided by drawing process fluid from upper end 213A-2 (i.e., instead of from lower end 214A-1, as utilized by reaction apparatus 210A1) include a reduction in the amount and size of solids carried in the process fluid by the circulation line through pump 217A and in-line mixer 216A, thereby extending the operating life of the pump/mixer devices.

Figure 4A:
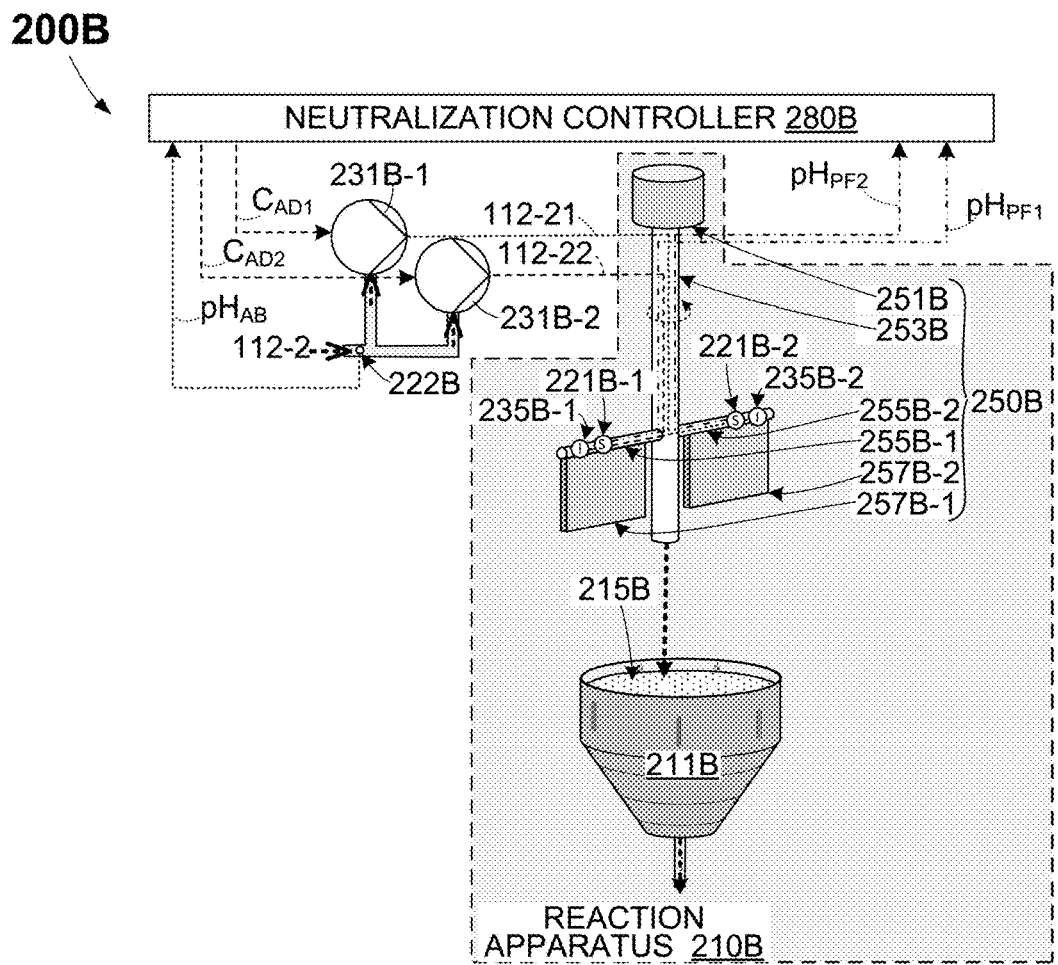
FIGS. 4A and 4B are a partially exploded view and partial cross-sectional view, respectively, showing an acid neutralization subsystem according to another specific embodiment.
Figure 4B:
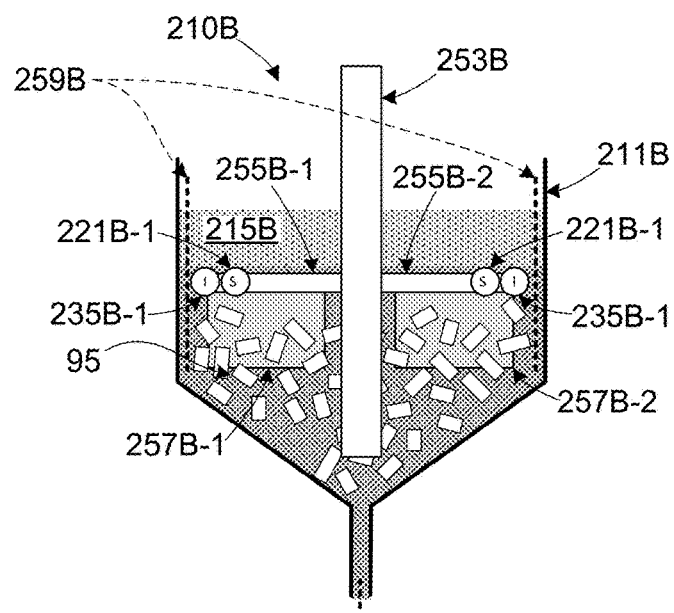

FIGS. 4A and 4B depict a simplified acid neutralization subsystem 200B including a reaction apparatus 210B, a neutralization controller 280B, sensors 221B-1 and 221B-2, and a dosing apparatus including acid dosing pumps 231B-1 and 231B-2 and corresponding injectors 235B-1 and 235B-2 that differ from corresponding structures of the previously mentioned acid neutralization subsystems in the manner set forth below. Note that several system features, such as an optional processing device, a separator, and an optional circulation line, are omitted for clarity and brevity.

Reaction apparatus 210B includes a reaction tank 211B that stores process fluid 215B in a manner similar to that of reaction apparatuses described in previous embodiments but differs in that it includes an optional cylindrical baffle 259B (shown in FIG. 4B) that is disposed inside reaction tank 211B and functions to increase fluid turbulence and in turn increase reaction rate, and also includes an agitator mechanism 250B that is configured to stir process fluid 215B disposed in reaction tank 211B. In some embodiments, agitator mechanism 250B includes a motor 251B, a drive shaft 253B extending into a central region of reaction tank 211B, support rods 255B-1 and 255B-2 extending radially from drive shaft 253B, and agitator blades 257B-1 and 257B-2 respectively attached to support rods 255B-1 and 255B-2. During operation, motor 251B rotates (turns) drive shaft 253B around its longitudinal axis, thereby causing agitator blades 257B-1 and 257B-2 to stir process fluid 215B. As depicted in FIG. 4B, the stirring action generated by agitator mechanism 250B serves to keep solid alkaline material particles 95 afloat in process fluid 215B in order to maximize contact between solid alkaline particles 95 and any un-neutralized acid substance (HCl) molecules disposed in product fluid 215B. In some embodiments both agitator blades 257B-1 and 257B-2 and support rods 255B-1 and 255B-2 are connected to drive shaft 253B such that agitator blades 257B-1 and 257B-2 remain in a fixed orientation relative to process fluid 215B during the stirring process. In other embodiments one or both of agitator blades 257B-1 and 257B-2 and support rods 255B-1 and 255B-2 are adjustable such that an angle of attack of each agitator blade 257B-1 and 257B-2 can be adjusted (i.e., in a manner similar to airplane flaps) to improve mixing by increasing or decreasing turbulence.

Sensors 221B-1 and 221B-2 and injectors 235B-1 and 235B-2 are disposed to move in corresponding circular paths along with agitator blades 257B-1 and 257B-2. Specifically, sensor 221B-1 and injector 235B-1 are mounted on support rod 255B-1, and sensor 221B-2 and injector 235B-2 are mounted on support rod 255B-2. With this arrangement, sensors 221B-1 and 221B-2 move in corresponding circular paths that are 180° apart through process fluid 215B (i.e., when drive shaft 253B is rotated by a motor 251B). Each sensor 221B-1 and 221B-2 is configured to continuously measure pH levels of process fluid 215B as it moves along its corresponding circular path and is configured to generate/transmit sensor data signals $pH_{PF1}$ and $pH_{PF2}$, respectively, thereby facilitating the measurement of process fluid pH levels from any location within reaction tank 211B that coincides with the circular path traveled by either of sensors 221B-1 and 221B-2. Similarly, each injector 235B-1 and 235B-2 is configured to inject acid byproduct 112-2 received from acid dosing pumps 231B-1 and 231B-2, respectively, into process fluid 215B as it moves along its corresponding circular path, thereby facilitating the injection of acid byproduct into any location within reaction tank 211B that coincides with the circular path traveled by either of injectors 235B-1 and 235B-2. As described below with reference to FIGS. 5A to 5F, this arrangement facilitates the detection of localized regions of process fluid 215B that may have relatively high pH levels and the localized injection of acid byproduct into those regions.

FIGS. 5A to 5F are top views showing reaction apparatus 210B (FIGS. 4A and 4B) at six times T0 to T5 during an exemplary operating period. Referring to FIG. 5A, for purposes of this example, it is assumed that process fluid 215B disposed in reaction tank 211B includes three regions 215B1, 215B2 and 215B3 (indicated by relatively light oval regions) that respectively have a higher pH level than a remainder of process fluid 215B located outside of these three regions. For brevity and clarity, it is also assumed that higher pH level regions 215B1 to 215B3 remain stationary within reaction tank 211B (i.e., these regions are not caused to significantly move in response to the operation of the agitator mechanism). Further, it is assumed that, at initial time T0, the location and size of higher pH level regions 215B1 and 215B2 (but not region 215B3) are known by way of sensor data gathered by sensor 221B-1 during a time period prior to time T0. In alternative embodiments, drive shaft 253B may rotate in one direction (e.g., as indicated by dashed-line arrow CP1 or may oscillate in two directions (as indicated by dashed-line arrow CP2).

FIG. 5A shows reaction apparatus 210B at time T0 when support rod 255B-2 is in an initial rotation angle θ0. At this point in time, support rods 255B-1 and 255B-2 are aligned within reaction tank 211B such that sensor 221B-1 and injector 235B-1 are positioned in process fluid 215B between higher pH level regions 215B3 and 215B1, and sensor 221B-2 and injector 235B-2 are positioned in process fluid 215B between higher pH level regions 215B2 and 215B3.

FIG. 5B shows reaction apparatus 210B at time T1 after support rod 255B-2 has rotated to angle θ1 (i.e., such that injector 235B-2 is rotated into a position located inside higher pH level region 215B1, and the corresponding rotation of support rod 255B-1 positions sensor 221B-1 inside higher pH level region 215B3). Referring to the upper portion of FIG. 5B, as the circular path of sensor 221B-1 passes through higher pH level region 215B3, sensor 221B-1 generates sensor data indicating the pH level, size and location of higher pH level region 215B3, and this information is transmitted to neutralization controller 280B (shown in FIG. 4A). Referring to the lower portion of FIG. 5B, as the circular path of injector 235B-2 passes through higher pH level region 215B1, neutralization controller 280B (shown in FIG. 4A) utilizes previously received sensor data that identifies the pH level, size and location of higher pH level region 215B1 to generate and transmit a pump control signal $C_{AD2}$ that causes second acid pump 231B-2 (FIG. 4A) to supply acid byproduct to injector 235B-2. Note that the amount and timing of the pump control signal $C_{AD2}$ is calculated by neutralization controller 280B such that an injected acid byproduct amount 112-21, which is indicated by a relatively dark oval region in FIG. 5B, passes through injector 235B-2 into higher pH level region 215B1, whereby the acid substance provided in injected acid byproduct amount 112-21 reduces the pH level within higher pH level region 215B3. Moreover, as indicated in FIGS. 5C and 5D, the injected acid byproduct amount 112-21 continues to disperse within process fluid 215B, and eventually reduces the pH level of higher pH level region 215B1 to that of the surrounding portions of process fluid 215B.

FIG. 5C shows reaction apparatus 210B at time T2 after support rod 255B-2 has rotated to angle θ2 (i.e., such that injector 235B-2 is rotated into a position located between higher pH level region 215B1 and higher pH level region 215B2, and the corresponding rotation of support rod 255B-1 positions sensor 221B-1 between higher pH level region 215B3 and higher pH level region 215B1. As mentioned above, the injected acid byproduct amount 112-21 continues to disperse within process fluid 215B, whereby the area occupied by higher pH level region 215B1 is further reduced.

FIG. 5D shows reaction apparatus 210B at time T3 after support rod 255B-2 has rotated to angle θ3 (i.e., such that injector 235B-2 is rotated into higher pH level region 215B2. Neutralization controller 280B (shown in FIG. 4A) utilizes previously received sensor data that identifies the pH level, size and location of higher pH level region 215B2 to generate and transmit a pump control signal CADE while injector 235B-2 travels along the portion of its circular path that passes through higher pH level region 215B1, thereby causing second acid pump 231B-2 (FIG. 4A) to supply acid byproduct to injector 235B-2 with an amount and timing that produces an injected acid byproduct amount 112-22, which is indicated by a relatively dark oval region in FIG. 5D, whereby the acid substance provided in injected acid byproduct amount 112-22 reduces the pH level within higher pH level region 215B2.

FIG. 5E shows reaction apparatus 210B at time T4 after support rod 255B-2 has rotated to angle θ4 (i.e., such that injector 235B-2 is rotated into a position located inside higher pH level region 215B3). As indicated, as the acid substance provided in injected acid byproduct amount 112-22 at time T3 disperses within process fluid 215B, higher pH level region 215B2 is gradually eliminated, thereby further increasing the rate of acid neutralization within reaction tank 211B. In addition, as the circular path of injector 235B-2 passes through higher pH level region 215B3, neutralization controller 280B (shown in FIG. 4A) asserts pump control signal CAD2 such that second acid pump 231B-2 supplies an injected acid byproduct amount 112-23 that passes through injector 235B-2 into higher pH level region 215B3, whereby the acid substance provided in injected acid byproduct amount 112-23 begins to reduce the pH level within higher pH level region 215B3.

FIG. 5F shows reaction apparatus 210B at time T5 after support rod 255B-2 has rotated further to angle θ5 (i.e., such that injector 235B-2 is rotated to a position outside of higher pH level region 215B3). As indicated, as the acid substance provided in injected acid byproduct amount 112-23 at time T4 disperses within process fluid 215B, higher pH level region 215B3 is gradually eliminated, thereby further increasing the rate of acid neutralization within reaction tank 211B.

Figure 6:
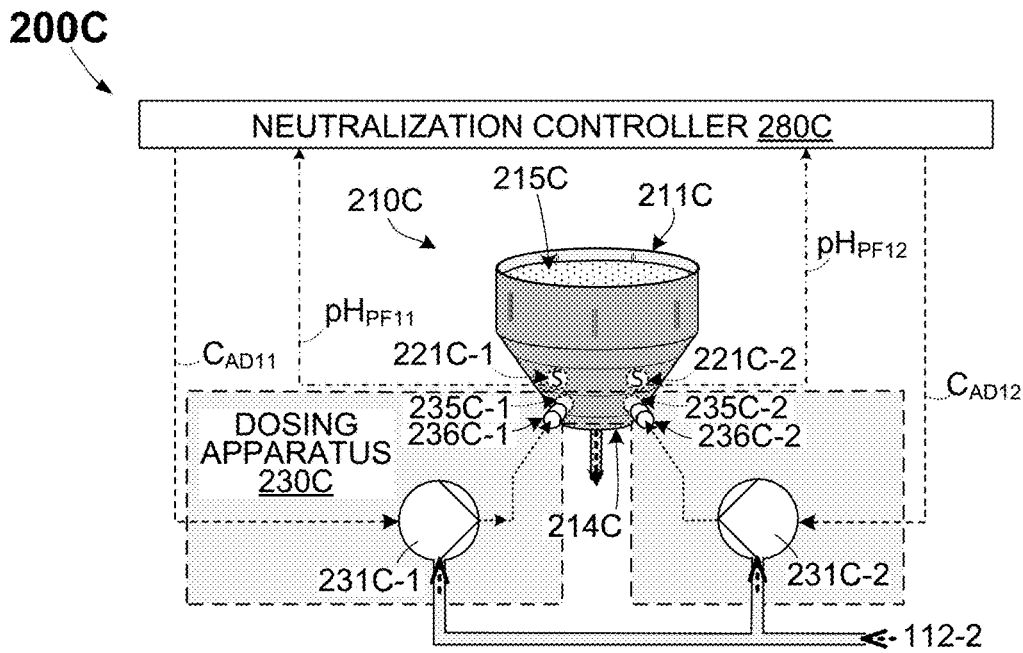
FIG. 6 is a partially exploded view showing an acid neutralization subsystem according to another specific embodiment.
Figure 7A:
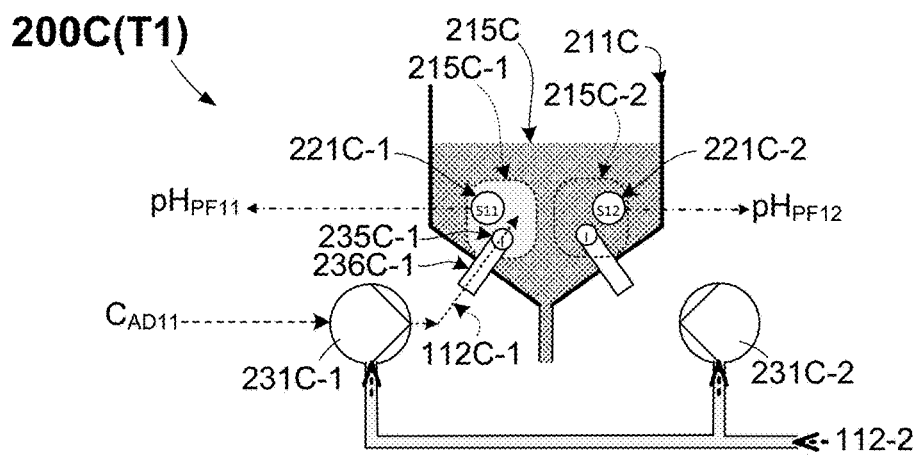
FIGS. 7A and 7B are cross-sectional side views showing a reaction apparatus of the acid neutralization subsystem of FIG. 6 during an exemplary acid neutralization process.
Figure 7B:
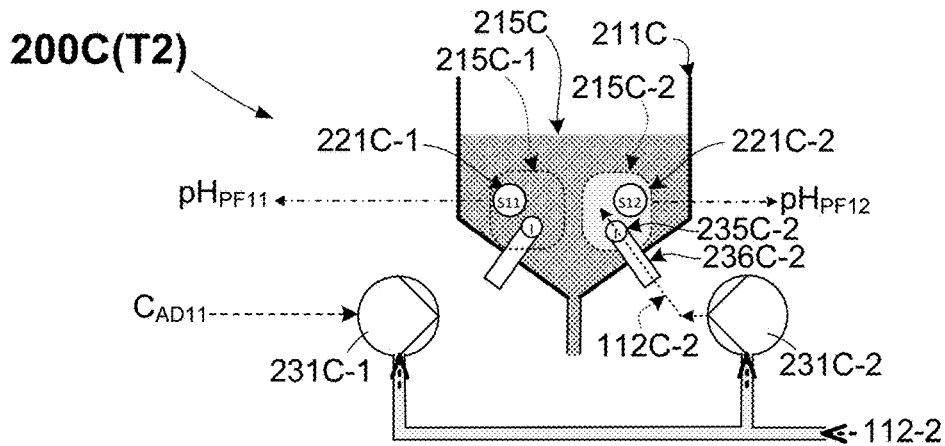

FIGS. 6, 7A and 7B depict a simplified acid neutralization subsystem 200C including a reaction apparatus 210C, sensors 221C-1 and 221C-2, a dosing apparatus 230C and a neutralization controller 280C. Reaction apparatus 210C includes a reaction tank 211C configured to store at least a portion of process fluid 215C in the manner set forth above. Sensors 221C-1 and 221C-2 and dosing apparatus 230C differ from corresponding structures of the previously mentioned acid neutralization subsystems in the manner set forth below. Note that several system features, such as an optional processing device, a separator, an optional circulation line, and an optional in-line mixer, are omitted for clarity and brevity.

Referring to the lower portion of FIG. 6, dosing apparatus 230C includes a pair of acid dosing pumps (flow control devices) 231C-1 and 231C-2 that are configured to control the flow of acid byproduct 112-2 through a corresponding pair of injectors 235C-1 and 235C-2, respectively. Injectors 235C-1 and 235C-2 are mounted in a spaced-apart arrangement on reaction tank 211C and are configured to inject acid byproduct portions received from acid dosing pumps 231C-1 and 231C-2, respectively, into portions of process fluid 215C occupying corresponding spaced-apart regions inside reaction tank 211C. That is, as described below with reference to FIG. 7A, first injector 235C-1 receives a first acid byproduct dose from acid dosing pump 231C-1 and injects the first acid byproduct dose into a corresponding (first) region of process fluid 215C. Similarly, as described below with reference to FIG. 7B, second injector 235C-2 is configured to receive a second acid byproduct dose from acid dosing pump 231C-2 and to inject the second acid byproduct dose 112C-2 into a corresponding second region 215C-2 (FIG. 7B) of the process fluid 215C. In some embodiments, first and second injectors 235C-1 and 235C-2 are disposed adjacent to a lower end 214C of reaction tank 211C and are respectively disposed on first and second associated protrusions (e.g., tubular posts) 236C-1 and 236C-2 that extend through a peripheral wall of reaction tank 211C.

Sensors 221C-1 and 221C-2 are mounted in reaction tank 211C and configured to measure pH levels of corresponding portions of process fluid 215C that are currently disposed in associated regions inside reaction tank 211C. As indicated in FIG. 7A, sensor 221C-1 is configured to measure a (first) pH level of a first portion 215C-1 of the process fluid disposed in an associated first reaction chamber region and to generate (e.g., periodically or continuously) an associated first sensor data signal $pH_{PF11}$ including the measured (first) pH level. As indicated in FIG. 7A, second sensor 221C-2 is configured to measure a (second) pH level of a second portion 215C-2 of the process fluid disposed in an associated second region and to generate (e.g., periodically or continuously) an associated second sensor data signal $pH_{PF12}$ including the measured (second) pH level. Note that the region associated with first process fluid portion 215C-1 is spaced from the region associated with second process fluid portion 215C-2. During operation, depending on operating parameters such as the size of reaction tank 211C and mechanisms used to intermix the fluids, the process fluid disposed in some regions of reaction tank 211C may achieve higher pH levels than other regions, and these higher pH levels cause lower acid neutralization efficiency (i.e., because the acid substance concentration in these regions is not as high as it could be). By utilizing two or more spaced-apart sensors to measure associated regions, the occurrence of higher pH levels in regions of reaction tank 211C can be readily detected and remedied in the manner described below.

Referring the upper portion of FIG. 6, acid neutralization controller 280C is configured to receive and utilize sensor data signals $pH_{AF11}$ and $pH_{AF12}$ from sensors 221C-1 and 221C-2, respectively, and to control acid dosing pumps 231C-11 and 231C-12 by way of pump control signals $C_{AD11}$ and $C_{AD11}$, respectively. As depicted in FIG. 7A, when sensor 221C-1 detects that process fluid portion 215C-1 has a relatively high pH level, sensor 221C-1 generates and transmits a corresponding sensor data signal $pH_{AF11}$ to acid neutralization controller 280C (FIG. 6). In response to sensor data signal $pH_{AF11}$, acid neutralization controller 280C asserts or otherwise generates and transmits pump control signals $C_{AD11}$ such that acid dosing pump 231C-11 is controlled to inject a (first) acid byproduct dose 112C-1 into reaction tank 211C by way of injector 235C-1. Note that the amount of acid byproduct associated with acid byproduct dose 112C-1 is controlled by acid neutralization controller 280C such that the pH level of process fluid portion 215C-1 is decreased but does not fall below a predetermined target pH level. Similarly, as depicted in FIG. 7B, when sensor 221C-2 detects that process fluid portion 215C-2 has a relatively high pH level, the corresponding sensor data signal $pH_{AF11}$ is received and processed by acid neutralization controller 280C, and pump control signals $C_{AD11}$ is generated such that acid dosing pump 231C-12 injects a (second) acid byproduct dose 112C-2 into reaction tank 211C by way of injector 235C-2. Note that, in each of the examples described above with reference to FIGS. 7A and 7B, acid byproduct is only injected into reaction tank 211C when the associated sensor data signal $pH_{PF11}$ and $pH_{PF12}$ is greater than the predetermined target pH level.

Note that acid neutralization subsystem 200C is described with reference to two sensors and two injectors for clarity and brevity, and that the reaction chamber of reaction tank 211C may be divided into a larger number of regions, each being monitored by a corresponding sensor, and each being adjusted by a corresponding injector/dosing pump.

Figure 8A:
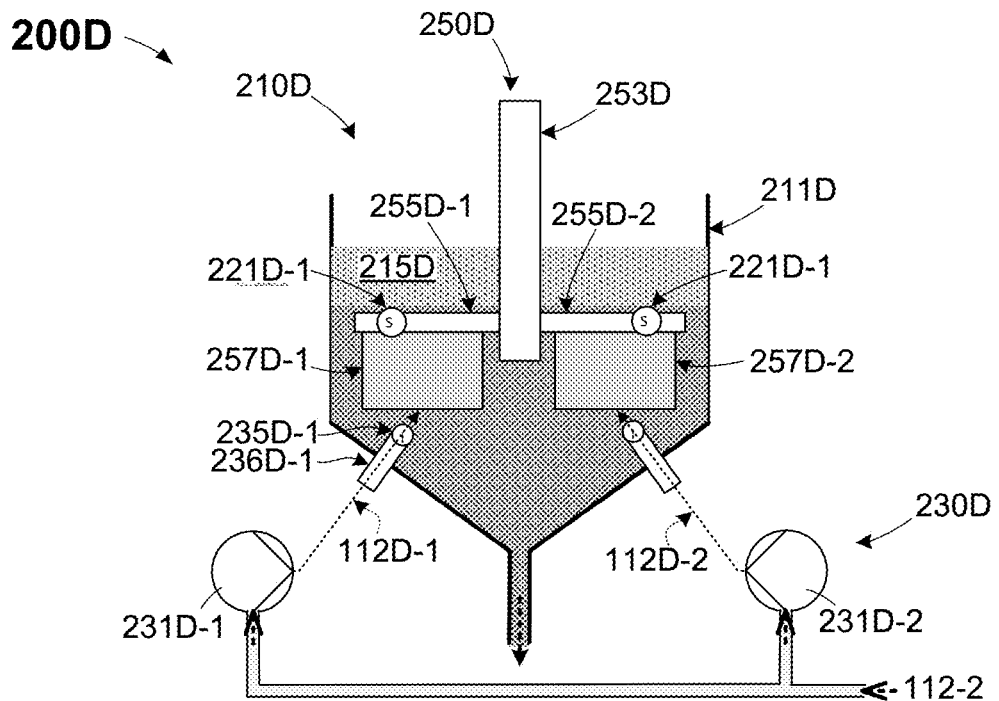
FIGS. 8A and 8B are cross-sectional side and top views, respectively, showing an acid neutralization subsystem according to another specific embodiment.
Figure 8B:
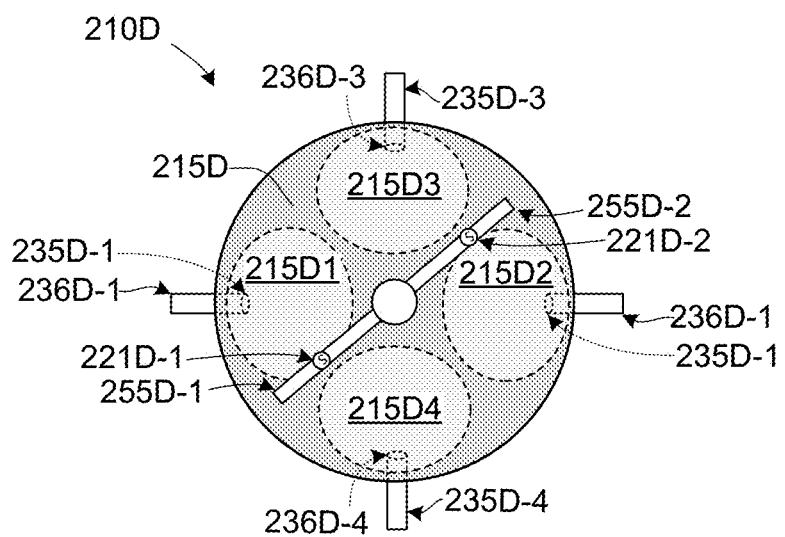

FIGS. 8A and 8B depict a simplified acid neutralization subsystem 200D including a reaction apparatus 210D, sensors 221D-1 and 221D-2, an agitator mechanism 250D and a dosing apparatus 230C. Reaction apparatus 210D includes a reaction tank 211D configured to store at least a portion of process fluid 215D in the manner set forth above. Agitator mechanism 250D includes a drive shaft 253D extending into a central region of reaction tank 211D, support rods 255D-1 and 255D-2 fixedly connected to and extending radially from drive shaft 253D, and agitator blades 257D-1 and 257D-2 attached support rods 255D-1 and 255D-2, respectively, and configured to stir process fluid 215D in the manner described above with reference to agitator mechanism 250B. Sensors 221D-1 and 221D-2 are mounted on support rods 255D-1 and 255D-2, respectively, such that both sensors 221D-1 and 221D-2 move in circular paths through process fluid 215D when drive shaft 253D is rotated by a motor (not shown) around its axis. Dosing apparatus 230D includes multiple injectors 235D-1, 235D-2, 235D-3 and 235D-4 that are fixedly mounted in a spaced-apart arrangement on reaction tank 211D, where each injector 235D-1 to 235D-4 is configured to inject acid byproduct into a corresponding region of reaction tank 211D. Similar to the arrangement described above with reference to FIG. 6, each injector 235D-1 to 235D-4 is disposed on an associated protrusion that extends through a peripheral wall of reaction tank 211D (e.g., referring to FIG. 8A, injectors 235D-1 and 235D-2 are disposed on protrusions 236D-1 and 236D-2, respectively). Each injector 235D-1 to 235D-4 is positioned and configured to inject acid byproduct into a corresponding region of reaction tank 211D (e.g., as indicated in FIG. 8B, injector 235D-1 is positioned to inject acid byproduct into a process fluid portion 215D1 located in a center-right region of reaction tank 211D, injector 235D-2 is positioned to inject acid byproduct into a process fluid portion 215D2 located in a center-left region of reaction tank 211D, injector 235D-3 is positioned to inject acid byproduct into a process fluid portion 215D3 located in an upper region of reaction tank 211D, and injector 235D-4 is positioned to inject acid byproduct into a process fluid portion 215D4 located in a lower region of reaction tank 211D). Note that several system features, such as an optional processing device, a separator, an optional circulation line, and an optional in-line mixer, are omitted from FIGS. 8A and 8B for clarity and brevity.

Figure 9:
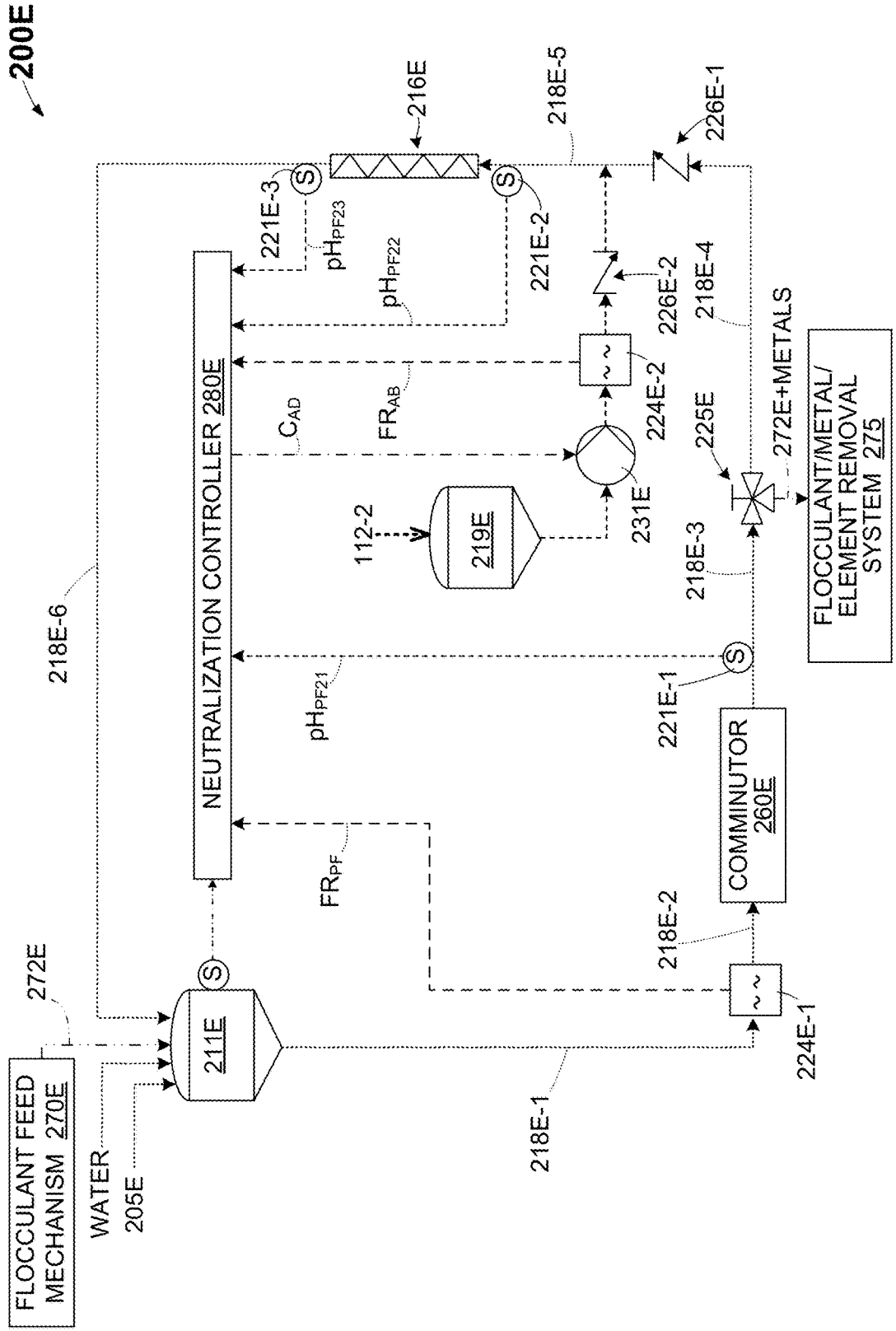
FIG. 9 is a piping diagram showing an acid neutralization subsystem according to another specific embodiment.

FIG. 9 depicts a simplified acid neutralization subsystem 200E including a reaction apparatus, sensors, a dosing apparatus and a neutralization controller 280E according to another exemplary embodiment. The reaction apparatus includes a reaction tank 211E configured to receive an aqueous alkaline solution 205E and water (or another aqueous fluid) and to store the resulting process fluid in the manner set forth above. Similar to reaction apparatus 210A1 (described above with reference to FIG. 2A), a portion of the process fluid flows along a circulation line formed by conduits 218E-1 to 218E-6 (indicated by dashed-line arrows) from reaction tank 211E, through an in-line mixer 216E and then back to reaction tank 211E. In this embodiment, acid byproduct 112-2 is temporarily stored in an acid storage tank 219E and is added to the process fluid flowing in the circulation line by way of incremental amounts (doses) generated by a dosing pump 231E, which is controlled in the manner described above by a pump control signal CAD transmitted from neutralization controller 280E. A first flowmeter 224E-1 measures a flow rate of process fluid in the circulation line and reports the measured flow rate by way of a sensor data signal $FR_{PF}$ that is transmitted to neutralization controller 280E. A second flowmeter 224E-2 measures a flow rate of acid byproduct and reports the measured flow rate to neutralization controller 280E by way of a sensor data signal $FR_{AB}$. A first pH sensor 221E-1 measures a pH of the process fluid leaving reaction tank 211E and reports the first pH level to neutralization controller 280E by way of a sensor data signal $pH_{PF21}$. The process fluid and acid byproduct flows converge (after passing through check valves 226E-1 and 226E-2) at a point upstream from in-line mixer 216E, where a second pH measurement is taken by a sensor 221E-2, which reports the second pH level to neutralization controller 280E by way of a sensor data signal $pH_{PF22}$. After passing through in-line mixer 216E, a third pH measurement is taken by a sensor 221E-3, which reports the third pH level to neutralization controller 280E by way of a sensor data signal $pH_{PF23}$. Other features, such as optional flow related structures (e.g., needle valves) and sensors (e.g., for measuring the conductivity of the process fluid), are omitted from FIG. 9 for clarity and brevity.

Referring to the lower portion of FIG. 9, acid neutralization sub-system 200E includes a comminutor 260E that is operably coupled to the circulation line (i.e., between conduits 218E-2 and 218E-3) such that the process fluid portion passing through conduit 218E-2 flows through comminutor 260E. As used herein, comminutor (grit processing subsystem) 260E represents any apparatus (e.g., an in-line grinder or macerator) capable of pulverizing, crushing, grinding, cutting, vibrating, or otherwise reducing the particle size of grit and/or other solid particles disposed in the process fluid portion passing through conduit 218E-2.

Referring to the upper left portion of FIG. 9, when aqueous alkaline solution 205E contains metals or hazardous elements, acid neutralization sub-system 200E may include a flocculant feed mechanism 270E that is configured to supply a suitable flocculant material 272E (e.g., chitosan) into the reaction tank 211E. Flocculant material 272E binds with the metals and/or hazardous elements to form a sediment that can be removed from the residual process fluid. In one embodiment, as indicated at the lower central portion of FIG. 9, a removal system 275E is coupled by way of a three-way valve 225E to the circulation line and is configured to remove this sediment from the process fluid portion passing through conduit 218E-3.

Although the invention is primarily described herein in the context of a subsystem (i.e., part of an OAE system) and as a mechanism for neutralizing an HCl-based acid byproduct, various novel aspects described herein may be beneficially utilized in other systems and methods without departing from the spirit and scope of the invention. For example, the acid neutralization subsystem described herein may be utilized as a stand-alone acid neutralization system or as a subsystem in another acid-producing system, and maybe utilized to neutralize other acid substances (i.e., other than HCl) disposed in an associated byproduct or other aqueous acid solution. Moreover, the methodology implemented by the present invention may be utilized to neutralize a wide variety of acid substances. It will be clear to those skilled in the art that the inventive features of the present invention are applicable to these other embodiments as well, and that all of which are intended to fall within the scope of the present invention.

The invention claimed is:

1. An ocean alkalinity enhancement (OAE) system comprising:
   a bipolar electrodialysis device (BPED) configured to generate an ocean alkalinity product and an acid byproduct including an acid substance by electrochemically processing a salt, the BPED also being configured to supply the ocean alkalinity product to an ocean in a way that both reduces atmospheric carbon dioxide in Earth's atmosphere and mitigates ocean acidification; and
   an acid neutralization subsystem configured to neutralize the acid substance using an aqueous alkaline fluid, the neutralization subsystem including:
      a reaction apparatus configured to store a process fluid comprising a mixture of the aqueous alkaline fluid and the acid byproduct;
      at least one sensor disposed in the reaction apparatus and configured to measure a pH level of the process fluid and to generate an associated sensor data signal including the measured process fluid pH level;
      a dosing apparatus including at least one flow control device configured to control a flow of at least one of the acid byproduct and the aqueous alkaline fluid into the reaction apparatus;
      a neutralization controller configured to receive and utilize the associated sensor data signal to control the at least one flow control device such that a maximum pH level of the process fluid remains equal to or greater than a target pH level, wherein the target pH level is a minimum pH level at which (i) a neutralization rate of the acid substance in the reaction apparatus is maximized, and (ii) generation and release of carbon dioxide from the reaction apparatus into Earth's atmosphere is prevented;
a second sensor configured to measure a pH level of the acid byproduct and to generate an associated sensor data signal including the measured acid byproduct pH level; and
a third sensor configured to measure a pH level of the aqueous alkaline fluid and to generate an associated third sensor data signal including the measured aqueous alkaline fluid pH level,
wherein the neutralization controller is configured to generate the target pH level using the second and third sensor data signals.

2. The OAE system of claim 1, further comprising a processing device configured to generate the aqueous alkaline fluid by processing an alkaline material and mixing the processed alkaline material with an aqueous fluid.

3. The OAE system of claim 1, wherein said at least one flow control device of the dosing apparatus comprises a dosing pump configured to control an injection rate of the acid byproduct into the reaction apparatus.

4. The OAE system of claim 1, wherein the acid neutralization subsystem further comprises a separator configured to remove spent process fluid from the reaction apparatus using one or more of filtration, flocculation, rectification, distillation, adsorption, absorption, evaporation, crystallization, electrodialysis and electrophoresis.

5. An ocean alkalinity enhancement (OAE) system comprising:
a bipolar electrodialysis device (BPED) configured to generate an ocean alkalinity product and an acid byproduct including an acid substance by electrochemically processing a salt, the BPED also being configured to supply the ocean alkalinity product to an ocean in a way that both reduces atmospheric carbon dioxide and mitigates ocean acidification; and
an acid neutralization subsystem configured to neutralize the acid substance using an aqueous alkaline fluid, the neutralization subsystem including:
a reaction apparatus configured to store a process fluid comprising a mixture of the aqueous alkaline fluid and the acid byproduct;
at least one sensor disposed in the reaction apparatus and configured to measure a pH level of the process fluid and to generate an associated sensor data signal including the measured process fluid pH level;
a dosing apparatus including at least one flow control device configured to control a flow of at least one of the acid byproduct and the aqueous alkaline fluid into the reaction apparatus; and
a neutralization controller configured to receive and utilize the associated sensor data signal to control the at least one flow control device such that a maximum pH level of the process fluid remains equal to or greater than a target pH level, wherein the target pH level is a minimum pH level at which (i) a neutralization rate of the acid substance in the reaction apparatus is maximized, and (ii) generation and release of carbon dioxide from the reaction apparatus into Earth's atmosphere is prevented,
wherein the reaction apparatus comprises:
a reaction tank configured to store a first portion of the process fluid;
one or more fluid conduits configured to form a circulation line extending between a lower end portion of the reaction tank and an upper end portion of the reaction tank; and
a pump operably coupled to said one or more fluid conduits and configured to pump a second portion of the process fluid between the lower end portion and the upper end portion of the reaction tank.

6. The OAE system of claim 5,
wherein the reaction apparatus further comprises an in-line mixer operably coupled to said one or more fluid conduits such that said second portion of the process fluid enters an inlet end of the in-line mixer and exits from an outlet end of the in-line mixer,
wherein the flow control device of the dosing apparatus is configured to control a flow of the acid byproduct into the inlet end of the in-line mixer,
wherein said at least one sensor is configured to measure a first pH level of the second process fluid portion located upstream of the in-line mixer, and wherein the neutralization controller is configured to control the flow control device such that a second pH level of the second process fluid portion located downstream of the in-line mixer remains equal to or greater than the target pH level.

7. The OAE system of claim 5, wherein the acid neutralization subsystem further comprises a grit processing subsystem operably coupled to said one or more fluid conduits such that said second portion of the process fluid flows through the grit processing subsystem, and
wherein the grit processing subsystem is configured to reduce a particle size of grit contained in the second portion of the process fluid.

8. The OAE system of claim 1,
wherein the reaction apparatus comprises a reaction tank configured to store the process fluid, and
wherein the reaction apparatus further comprises an agitator mechanism configured to stir the process fluid disposed in the reaction tank.

9. The OAE system of claim 8, wherein the agitator mechanism comprises a drive shaft extending into a central region of the reaction tank, one or more support rods extending radially from the drive shaft, and one or more agitator blades attached to the one or more support rods and configured to stir the process fluid disposed in the reaction tank when the drive shaft is rotated around its axis.

10. An ocean alkalinity enhancement (OAE) system comprising:
a bipolar electrodialysis device (BPED) configured to generate an ocean alkalinity product and an acid byproduct including an acid substance by electrochemically processing a salt, the BPED also being configured to supply the ocean alkalinity product to an ocean in a way that both reduces atmospheric carbon dioxide and mitigates ocean acidification; and
an acid neutralization subsystem configured to neutralize the acid substance using an aqueous alkaline fluid, the neutralization subsystem including:
a reaction apparatus configured to store a process fluid comprising a mixture of the aqueous alkaline fluid and the acid byproduct;
at least one sensor disposed in the reaction apparatus and configured to measure a pH level of the process fluid and to generate an associated sensor data signal including the measured process fluid pH level;
a dosing apparatus including at least one flow control device configured to control a flow of at least one of the acid byproduct and the aqueous alkaline fluid into the reaction apparatus; and a neutralization controller configured to receive and utilize the associated sensor data signal to control the at least one flow control device such that a maximum pH level of the process fluid remains equal to or greater than a target pH level, wherein the target pH level is a minimum pH level at which (i) a neutralization rate of the acid substance in the reaction apparatus is maximized, and (ii) generation and release of carbon dioxide from the reaction apparatus into Earth's atmosphere is prevented, wherein the reaction apparatus comprises a reaction tank configured to store the process fluid, and wherein the reaction apparatus further comprises an agitator mechanism configured to stir the process fluid disposed in the reaction tank, wherein the agitator mechanism comprises a drive shaft extending into a central region of the reaction tank, one or more support rods extending radially from the drive shaft, and one or more agitator blades attached to the one or more support rods and configured to stir the process fluid disposed in the reaction tank when the drive shaft is rotated around its axis, and wherein the at least one sensor is mounted on the one or more support rods such that the at least one sensor moves in a circular path through the process fluid disposed in the reaction tank when the drive shaft is rotated around its axis.

11. The OAE system of claim 10, wherein the dosing apparatus further comprises at least one injector mounted on the one or more support rods adjacent to the at least one sensor such that the at least one injector moves in the circular path through the process fluid, said at least one injector being operably coupled to receive the acid byproduct from the at least one flow control device such that the acid byproduct is injected through the at least one injector into the process fluid.

12. The OAE system of claim 10, wherein the dosing apparatus comprises a plurality of injectors fixedly mounted in a spaced-apart arrangement on the reaction tank, each said injector being configured to inject acid byproduct into an associated portion of the process fluid disposed in a corresponding region of the reaction tank.

13. An ocean alkalinity enhancement (OAE) system comprising:
a bipolar electrodialysis device (BPED) configured to generate an ocean alkalinity product and an acid byproduct including an acid substance by electrochemically processing a salt, the BPED also being configured to supply the ocean alkalinity product to an ocean in a way that both reduces atmospheric carbon dioxide and mitigates ocean acidification; and
an acid neutralization subsystem configured to neutralize the acid substance using an aqueous alkaline fluid, the neutralization subsystem including:
a reaction apparatus configured to store a process fluid comprising a mixture of the aqueous alkaline fluid and the acid byproduct;
at least one sensor disposed in the reaction apparatus and configured to measure a pH level of the process fluid and to generate an associated sensor data signal including the measured process fluid pH level;
a dosing apparatus including at least one flow control device configured to control a flow of at least one of the acid byproduct and the aqueous alkaline fluid into the reaction apparatus; and a neutralization controller configured to receive and utilize the associated sensor data signal to control the at least one flow control device such that a maximum pH level of the process fluid remains equal to or greater than a target pH level, wherein the target pH level is a minimum pH level at which (i) a neutralization rate of the acid substance in the reaction apparatus is maximized, and (ii) generation and release of carbon dioxide from the reaction apparatus into Earth's atmosphere is prevented, wherein the reaction apparatus comprises a reaction tank configured to store the process fluid, and wherein said at least one flow control device of the dosing apparatus comprises first and second flow control devices, and first and second injectors mounted in a spaced-apart arrangement on the reaction tank, said first injector being configured to receive a first acid byproduct dose from a first flow control device and to inject the first acid byproduct dose into a first portion of the process fluid disposed in a corresponding first region of the reaction tank, and said second injector being configured to receive a second acid byproduct dose from a second flow control device and to inject the second acid byproduct dose into a second portion of the process fluid disposed in a corresponding second region of the reaction tank.

14. The OAE system of claim 13,
wherein the at least one sensor comprises first and second sensors disposed in the reaction tank, the first sensor being configured to measure a first pH level of the first portion of the process fluid disposed in the first region of the reaction tank and to generate an associated first sensor data signal including the measured first pH level, and the second sensor being configured to measure the second pH level of a second portion of the process fluid disposed in the second region and to generate an associated second sensor data signal including the measured second pH level, and wherein the neutralization controller is configured to receive and utilize the first and second sensor data signals and to control the first and second flow control devices such that the first acid byproduct dose is injected by way of the first injector only when the first sensor data signal indicates that the first pH level of the first process fluid portion disposed in the first region is greater than a predetermined target pH level, and such that the second acid byproduct dose is injected by way of the second injector only when the second sensor data signal indicates that the second pH level of the second process fluid portion disposed in the second region is greater than the predetermined target pH level.

15. An ocean alkalinity enhancement (OAE) system comprising:
a bipolar electrodialysis device (BPED) configured to generate an ocean alkalinity product and an acid byproduct including an acid substance by electrochemically processing a salt, the BPED also being configured to supply the ocean alkalinity product to an ocean in a way that both reduces atmospheric carbon dioxide and mitigates ocean acidification; and
an acid neutralization subsystem configured to neutralize the acid substance using an aqueous alkaline fluid, the neutralization subsystem including:
a reaction apparatus configured to store a process fluid comprising a mixture of the aqueous alkaline fluid and the acid byproduct;

at least one sensor disposed in the reaction apparatus and configured to measure a pH level of the process fluid and to generate an associated sensor data signal including the measured process fluid pH level;

a dosing apparatus including at least one flow control device configured to control a flow of at least one of the acid byproduct and the aqueous alkaline fluid into the reaction apparatus; and a neutralization controller configured to receive and utilize the associated sensor data signal to control the at least one flow control device such that a maximum pH level of the process fluid remains equal to or greater than a target pH level, wherein the target pH level is a minimum pH level at which (i) a neutralization rate of the acid substance in the reaction apparatus is maximized, and (ii) generation and release of carbon dioxide from the reaction apparatus into Earth's atmosphere is prevented, wherein the reaction apparatus comprises a reaction tank configured to store the process fluid, and wherein the acid neutralization subsystem further comprises:

a flocculant feed mechanism configured to supplying a flocculant material into the reaction tank; and a removal system configured to remove sediment comprising the flocculant material from the process fluid.

16. A method for neutralizing an acid substance disposed in an aqueous acid solution, the method comprising generating a process fluid by mixing the aqueous acid solution with an aqueous alkaline fluid, wherein a first pH level of the aqueous acid solution is lower than a target pH level and a second pH level of the aqueous alkaline fluid is higher than the target pH level, wherein said mixing includes controlling at least one of a first flow rate at which the aqueous acid solution is added to the process fluid and a second flow rate at which the aqueous alkaline fluid is added to the process fluid such that a third pH level of the process fluid is equal to or greater than the target pH level, wherein the target pH level is equal to a minimum pH level at which (i) a neutralization rate of the acid substance in the process fluid is maximized, and (ii) generation and release of carbon dioxide from the process fluid into Earth's atmosphere is prevented, and wherein mixing the aqueous acid solution with the aqueous alkaline fluid comprises:

adding the aqueous alkaline fluid to a first portion of the process fluid that is stored in a reaction tank;

pumping a second portion of the process fluid along a circulation line between a lower end portion and an upper end portion of the reaction tank; and adding the aqueous acid solution to at least one of the first portion stored in the reaction tank and the second portion by way of an in-line mixer that is operably coupled to the circulation line.

17. The method of claim 16, further comprising generating the aqueous alkaline fluid by processing an alkaline material and mixing the processed alkaline material with an aqueous fluid.

* * * * *